United States Patent
Franz

(10) Patent No.: US 7,058,641 B1
(45) Date of Patent: Jun. 6, 2006

(54) INFORMATION DISTRIBUTION SYSTEM AND METHOD

(76) Inventor: Gregory J. Franz, 231 W. Rockland Rd., Libertyville, IL (US) 60048

( * ) Notice: Subject to any disclaimer, the term of this patent is extended or adjusted under 35 U.S.C. 154(b) by 533 days.

(21) Appl. No.: 09/924,376

(22) Filed: Aug. 8, 2001

Related U.S. Application Data

(60) Provisional application No. 60/223,766, filed on Aug. 8, 2000.

(51) Int. Cl.
*G06F 17/30* (2006.01)

(52) U.S. Cl. ............... 707/101; 707/100; 707/102; 709/229

(58) Field of Classification Search .......... 707/1–10, 707/100–104.1; 709/205–207, 229
See application file for complete search history.

(56) References Cited

U.S. PATENT DOCUMENTS

| | | | |
|---|---|---|---|
| 5,247,661 A | 9/1993 | Hager et al. | |
| 5,428,778 A | 6/1995 | Brookes | |
| 5,627,764 A | 5/1997 | Schutzman et al. | |
| 5,632,018 A | 5/1997 | Otorii | |
| 5,781,901 A * | 7/1998 | Kuzma | 707/10 |
| 5,801,702 A * | 9/1998 | Dolan et al. | 345/854 |
| 5,812,773 A | 9/1998 | Norin | |
| 5,822,526 A * | 10/1998 | Waskiewicz | 709/206 |
| 5,848,248 A | 12/1998 | Kawasaki et al. | |
| 5,864,684 A | 1/1999 | Nielsen | |
| 5,884,323 A * | 3/1999 | Hawkins et al. | 707/201 |
| 5,892,909 A | 4/1999 | Grasso et al. | |
| 5,903,723 A * | 5/1999 | Beck et al. | 709/200 |
| 5,911,776 A * | 6/1999 | Guck | 707/104.1 |
| 5,923,845 A * | 7/1999 | Kamiya et al. | 709/206 |
| 6,073,137 A * | 6/2000 | Brown et al. | 707/104.1 |
| 6,105,056 A | 8/2000 | Gilchrist et al. | |
| 6,147,687 A * | 11/2000 | Wanderski | 707/201 |
| 6,147,773 A | 11/2000 | Taylor et al. | |
| 6,192,396 B1 * | 2/2001 | Kohler | 707/10 |
| 6,252,588 B1 * | 6/2001 | Dawson | 709/206 |
| 6,311,211 B1 * | 10/2001 | Shaw et al. | 709/206 |
| 6,345,288 B1 * | 2/2002 | Reed et al. | 707/104.1 |
| 6,453,353 B1 * | 9/2002 | Win et al. | 709/229 |
| 6,505,214 B1 * | 1/2003 | Sherman et al. | 707/201 |
| 6,526,413 B1 * | 2/2003 | Schwitters et al. | 707/104.1 |
| 6,549,916 B1 * | 4/2003 | Sedlar | 707/200 |
| 6,553,425 B1 * | 4/2003 | Shah et al. | 709/245 |
| 6,704,772 B1 * | 3/2004 | Ahmed et al. | 709/207 |
| 2002/0023132 A1 * | 2/2002 | Tornabene et al. | 709/205 |
| 2003/0097361 A1 * | 5/2003 | Huang et al. | 707/10 |

OTHER PUBLICATIONS

Crocker, David H., "Standard for the Format of ARPA Internet Text Messages", Aug. 13, 1982, pp. 1-46, http://www.cis.ohio-state.edu/htbin/rfc822.html.

* cited by examiner

*Primary Examiner*—Jean Corrielus
*Assistant Examiner*—Anh Ly

(57) ABSTRACT

An information distribution system distributes data sets according to a hierarchical association among classes and recipients so that each recipient receives a recipient data set of data sets associated only with that recipient.

52 Claims, 23 Drawing Sheets

| REC | CLASS | IDNO | LAST NAME | FIRST NAME | EMAILADR |
|---|---|---|---|---|---|
| 1 | RETAIL | 001 | SMITH | JOHN | JSMITH@NOWHERE.COM |
| 2 | RETAIL | 017 | JONES | MARY | MJONES@NOWHERE.COM |
| 3 | RETAIL | 234 | MACK | JOE | JMACK@NOWHERE.COM |
| 4 | LEGAL | 11 | BAXENDALE | HADLEY | HBAXEN@NOWHERE.COM |
| 5 | LEGAL | 137 | NELSON | JAMES | JNELSON@NOWHERE.COM |
| 6 | LEGAL | 138 | DREW | AMY | ADREW@NOWHERE.COM |
| 7 | ADMIN | 256 | DOE | MARY | MDOW@NOWHERE.COM |
| 8 | ADMIN | 311 | WELLS | STEVE | SWELLS@NOWHERE.COM |

Fig. 2A

INFORMATION DISTRIBUTION SYSTEM AND METHOD

This application claims benefit of U.S. Provisional Application Ser. No. 60/223,766, filed Aug. 8, 2000, the disclosure of which is incorporated herein by reference.

FIELD OF THE INVENTION

The invention relates to information distribution systems, and more particularly, to an e-mail distribution system and method.

BACKGROUND AND SUMMARY OF THE INVENTION

Common methods of distributing e-mail messages include e-mailing a message to an individual address or several individual addresses, or e-mailing a message to a group mailing list comprising a list of individual mailing addresses. Often the e-mail message includes one or more attached files or data sets, which are usually word processing documents, spreadsheet documents, or image files.

However, e-mailing a message to an individual address, several individual addresses, or to a group requires multiple preparation steps. The sender of the message must choose from a list of e-mail addresses to select recipients or groups, type in a subject, and manually select and attach the files to be included in the e-mail. Upon completing the selection of recipients and attachments, the sender will usually invoke a "send" command which sends the e-mail message to the recipients. Thus, if the sender later finds the need to include another attached file, the sender must generate another e-mail message to the same recipients. Often, an explanatory note is included in the second message so as to avoid confusion among the recipients as to why another document has been received. Accordingly, as this process is repeated throughout the day, productivity is lost.

Reduction of system bandwidth is another drawback in common e-mail systems. Often senders do not compress attached files to reduce the size of the e-mail messages because of the intervening step of compressing the files before attaching them to the e-mail message. The time involved to individually compress each attached file would further reduce productivity, so senders often do not bother compressing attachments, thereby making inefficient use of system bandwidth.

Finally, the sheer volume of e-mail messages received by recipients reduces productivity. Often recipients must individually scroll through dozens of e-mail messages received each hour. Senders often omit a subject heading for an e-mail message, or fail to provide a descriptive subject heading. Thus, recipients must spend additional time evaluating the contents and importance of the message. Productivity is further reduced by senders sending e-mail messages and attachments (as soon as they find information related to a common subject), or, as mentioned above, as a result of overlooking a necessary file that should have been included in an earlier e-mail message.

The disclosure of the present invention provides a novel method of distributing an e-mail message, including e-mailing data sets to several individual addresses, or e-mailing a group of data sets to a group mailing list comprising a list of individual mailing addresses, so that each recipient receives a recipient data set that includes only data associated with that recipient. Each recipient data set is generated automatically based on the placement of data sets within a class hierarchy, the class hierarchy associated with a plurality of recipient accounts corresponding to a plurality of recipients.

According to the invention, a method of distributing data to a plurality of recipients associated with a corresponding plurality of recipient accounts comprises the steps of associating a plurality of classes arranged in a class hierarchy with the plurality of recipient accounts; associating a plurality of data sets with the plurality of classes and the plurality of recipient accounts; creating a plurality of recipient data sets by associating each data set associated with a class to each recipient account associated with the class so that each recipient data set includes only data sets associated with each corresponding recipient account; and distributing the plurality of recipient data sets to the corresponding plurality of recipients.

Also according to the invention, a system for distributing data to a plurality of recipients associated with a corresponding plurality of recipient accounts comprises means for associating a plurality of classes arranged in a class hierarchy with the plurality of recipient accounts; means for associating a plurality of data sets with the plurality of classes and the plurality of recipient accounts; means for creating a plurality of recipient data sets by associating each data set associated with a class to each recipient account associated with the class so that each recipient data set includes only data sets associated with each corresponding recipient account; and means for distributing the plurality of recipient data sets to the corresponding plurality of recipients.

Also according to the invention, an apparatus for distributing data to a plurality of recipients corresponding to a plurality of recipient accounts comprises a computer storage medium storing a data structure and a program; a computer system having access to the computer storage medium and configured to execute the application program; wherein the data structure includes a plurality of classes arranged in a class hierarchy, and further includes the plurality of recipient accounts associated with the plurality of classes; and wherein the program associates data sets to selected classes and selected recipient accounts, creates a plurality of recipient data sets by associating data sets associated with a selected class to the recipient accounts associated with the selected class so that each recipient data set includes only data sets associated with each corresponding recipient account, and distributes the plurality of recipient data sets to the corresponding plurality of recipients.

Also according to the invention, a method of e-mailing files comprises the steps of associating a first file with a class of recipients; associating a second file with one recipient in the class; creating a data set for each recipient in the class, wherein only the data set corresponding to the one recipient includes the second file; and distributing the data sets to the recipients.

Also according to the invention, a program for distributing files to recipients connected by a network comprises code for defining a class of recipients; code for associating a first file with the class of recipients; code for associating a second file with one recipient in the class; code for creating a data set for each recipient in the class, wherein only the data set corresponding to the one recipient includes the second file; and code for distributing the data sets to the recipients.

Additional features and advantages of the present invention will become apparent to those skilled in the art upon consideration of the following detailed description of illustrated embodiments exemplifying the best mode of carrying out the invention as presently perceived.

BRIEF DESCRIPTION OF THE DRAWINGS

FIG. 2A depicts a record table in which a user defines recipient data for use in the invention.

DETAILED DESCRIPTION OF THE DRAWINGS

Figure 1:
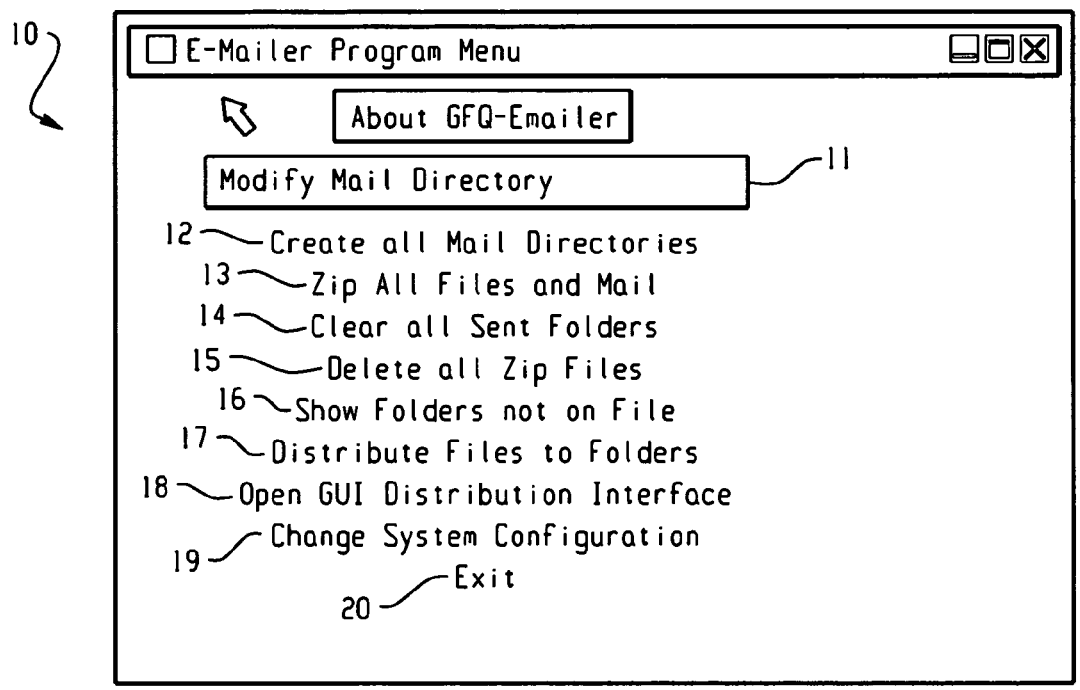
FIG. 1 shows a main software menu associated with the invention.

FIG. 1 shows a main software menu 10 associated with the invention. Available for selection by a user are menu options Modify Mail Directory 11, Create All Mail Directories 12, Zip All Files and Mail 13, Clear All Sent Folders 14, Delete All Zip Files 15, Show Folders Not on File 16, Distribute Files to Folder 17, Open GUI Distribution Interface 18, Change System Configuration 19, and Exit 20.

Figure 2B:
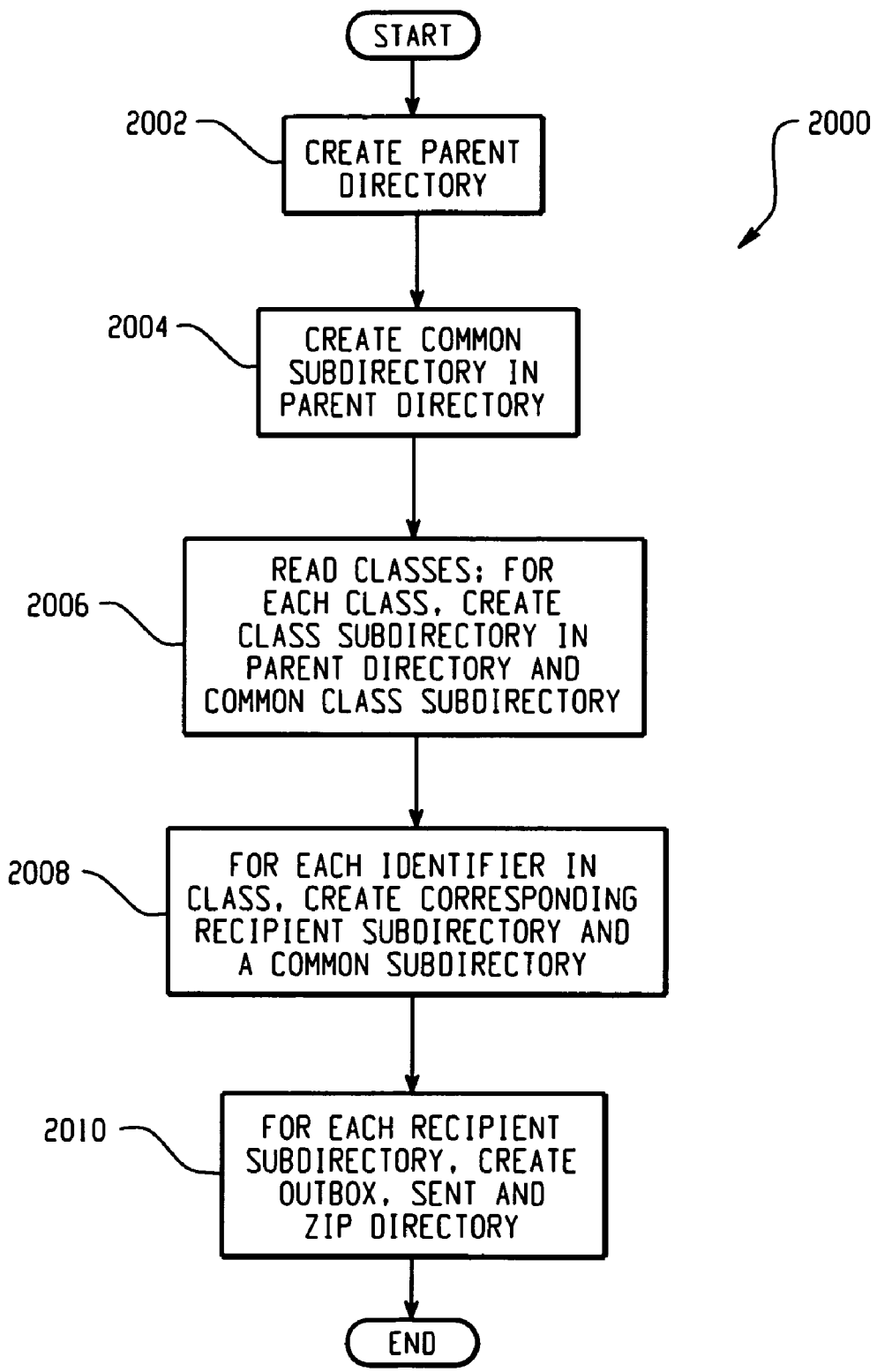
FIG. 2B is a flow diagram illustrating a method of creating a directory structure of a linked hierarchy based on the user defined information contained in the record table.

Selection of Modify Mail Directory 11 allows the user to edit record table 30, as shown in FIG. 2. In accordance with the invention, each entry corresponds to an e-mail recipient and contains a record field 31, a class field 32, and identification number field 33, a last name field 34, a first name field 35, and an e-mail address field 36. The e-mail address field 36 is the e-mail address of a recipient's e-mail account. Each recipient is assigned a unique identification number 33, and a class designation 32. The class designation can be unique or can be a common class designation as shown, e.g., "RETAIL," "LEGAL" or "ADMIN."

Figure 3:
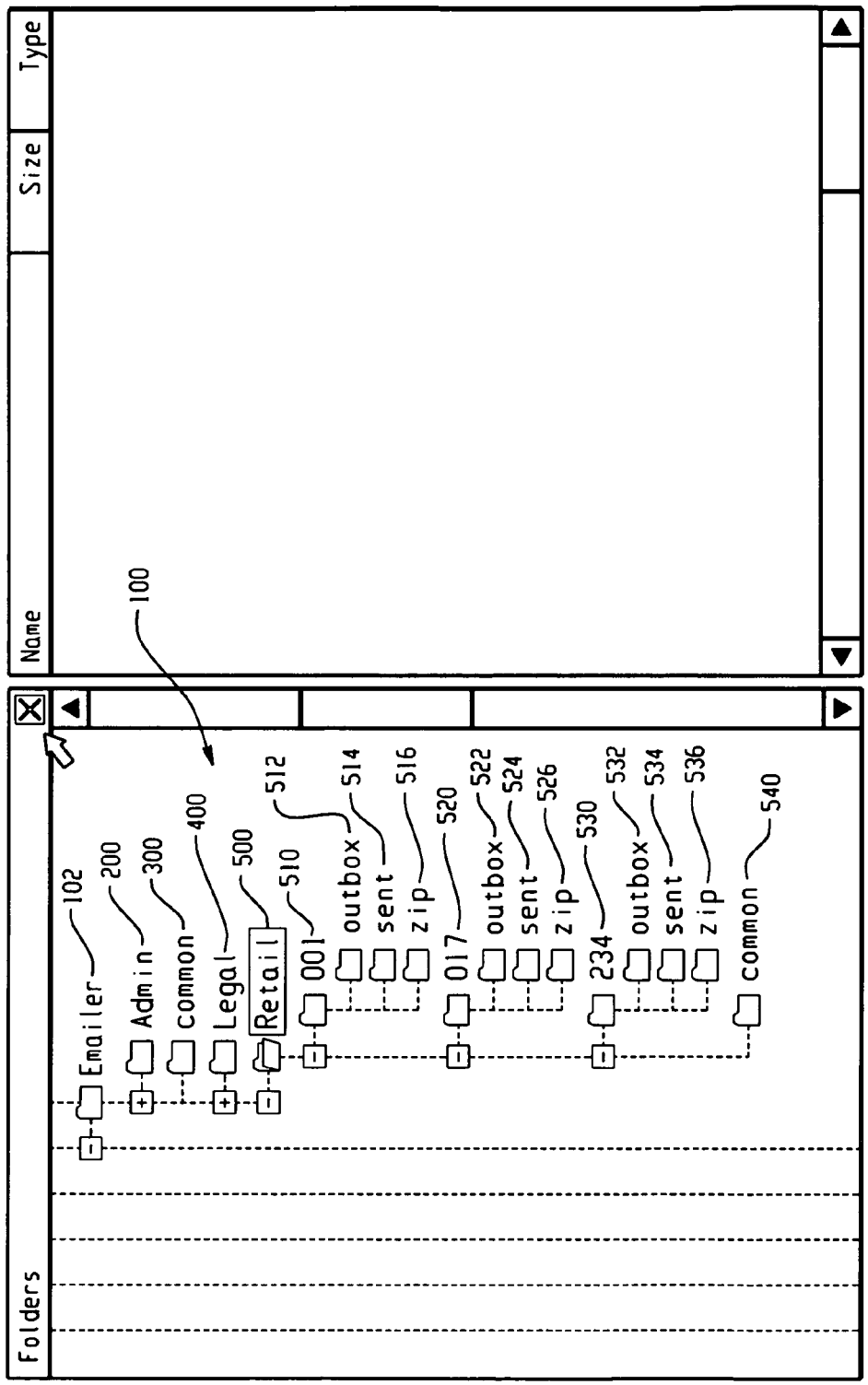
FIG. 3 depicts a partial directory structure of a linked hierarchy based on the user defined information contained in the record table.

Selecting Create All Mail Directories 12 creates a directory structure 100 of a linked hierarchy based on the user defined information contained in the record table 30. As shown in FIG. 3, directory structure 100 is contained in the directory Emailer 102. Directory Emailer 102 contains four subdirectories: Admin 200, Common 300, Legal 400, and Retail 500. Subdirectories Admin 200, Legal 400 and Retail 500 are created from the class designations contained in record table 30. Subdirectory Common 300 is created in addition to the class designations in record table 30.

Within each subdirectory Admin 200, Legal 400 and Retail 500 are recipient subdirectories corresponding to the identification numbers 33 listed for each class 32 in record table 30. Thus, as shown for the subdirectory Retail 500, recipient subdirectory 510 is created for the recipient identified by user identification number 001, e.g., "John Smith." Illustratively, a recipient subdirectory, or recipient account, corresponds to a recipient e-mail account to which e-mail is sent and accessed by the actual recipient. Likewise, recipient subdirectories 520 and 530 are created for recipients identified by the user identification numbers 017 and 234, respectively. Finally, a common class subdirectory 540 is created in addition to the recipient subdirectories. Common class subdirectories are also created within each subdirectory Admin 200 and Legal 400, but are not shown in FIG. 3.

Within each recipient subdirectory are three mailing subdirectories: outbox, sent and zip. Files pending delivery are stored in the outbox directory. After files are sent, the files are moved from the outbox directory to the sent directory. The zip directory contains the files in a compressed format.

The process of creating the directory structure described above is better understood with reference to FIG. 2B, which depicts a flow diagram 2000 illustrating a method of creating a directory structure of a linked hierarchy based on the user defined information contained in the record table 30. In step 2002, a parent directory is created. As shown in FIG. 3, the parent directory is Emailer 102. All further directories are subdirectories of the parent directory. In step 2004, the subdirectory Common is created in the parent directory. In step 2006, all classes in record table 30 are read, and for each class, a class subdirectory is created in the parent directory. A common class subdirectory is created in each class subdirectory. Similarly, in step 2008, all recipients in each class are read, and for each class, recipient subdirectories are created in the corresponding class subdirectory. In step 2010, the outbox, sent and zip subdirectories are created in each recipient subdirectory.

The exemplary embodiment of the present invention facilitates efficient queuing and sending of e-mail messages as follows. Files are distributed according to a parent-common subdirectory relationship, i.e, each file placed in a common subdirectory of a parent directory is then distributed to all other subdirectories within the parent directory. However, files placed directly in recipient outbox directories are not distributed to other recipient outboxes. Illustratively, a file placed in subdirectory common 540 is distributed to recipient subdirectories 510, 520 and 530, and a file placed in recipient subdirectory 510 is not distributed to any other directory.

One skilled in the art will appreciate that other distribution schemes which accomplish similar results are within the scope and spirt of the invention described herein. For example, common class subdirectories can be removed from the class subdirectories and named accordingly to identify the parent-common subdirectory relationship. Thus, common class subdirectory 540, which is the common subdirectory for class directory Retail 500, can be named "COMMON-RETAIL" and moved to a different location within the directory tree.

In an illustrative example, a user sends a first file (or data set), file1.txt, to the recipients identified by identification number 001, i.e., "John Smith," a second file, file11.txt, to all recipients in the "RETAIL" class, and a third file, file21.txt, to all recipients in all classes as stored in record table 30. Rather than creating three separate e-mail messages in which the user must address each message separately and selectively attach the data sets to create a recipient data set for each recipient of the message, the user places the data sets within the directory structure 100 and the recipient data sets and e-mail messages are automatically generated when the user invokes a mailing command.

Figure 4:
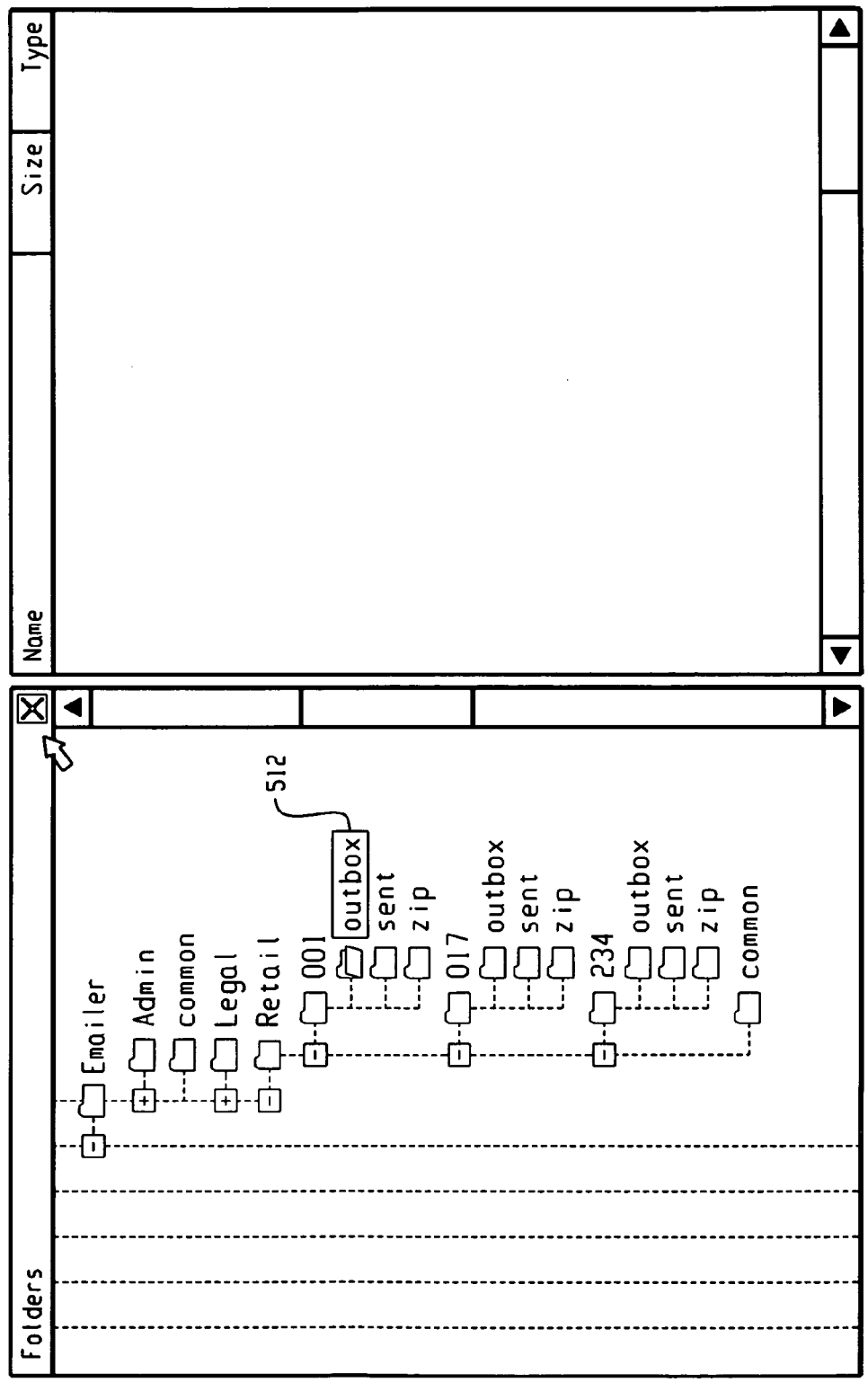
FIG. 4 is an expanded view of the directory structure of FIG. 3 showing no pending files in an outbox corresponding to a recipient identification number.
Figure 5:
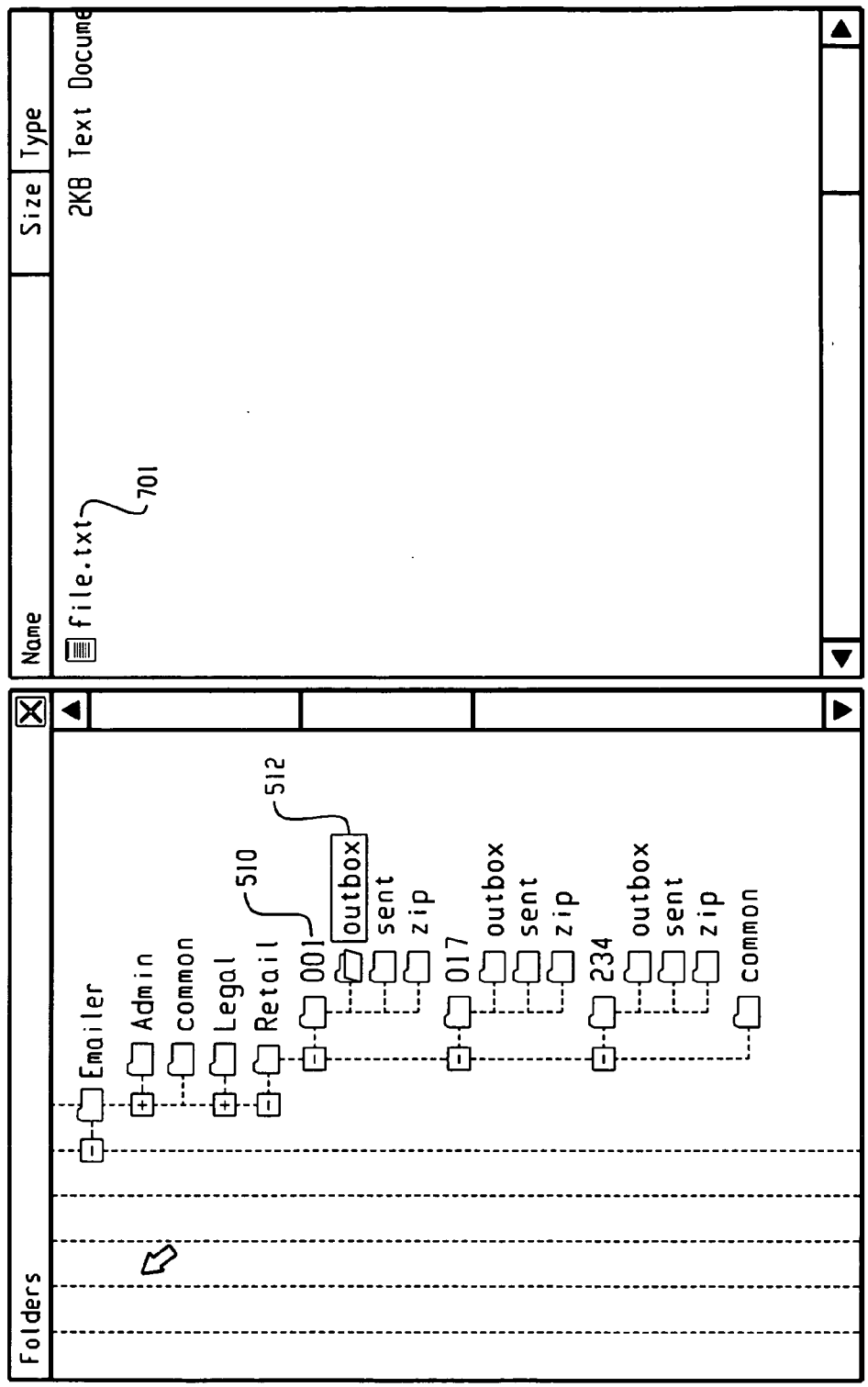
FIG. 5 is an expanded view of the directory structure of FIG. 3 showing a pending file in an outbox corresponding to a recipient identification number.
Figure 15A:
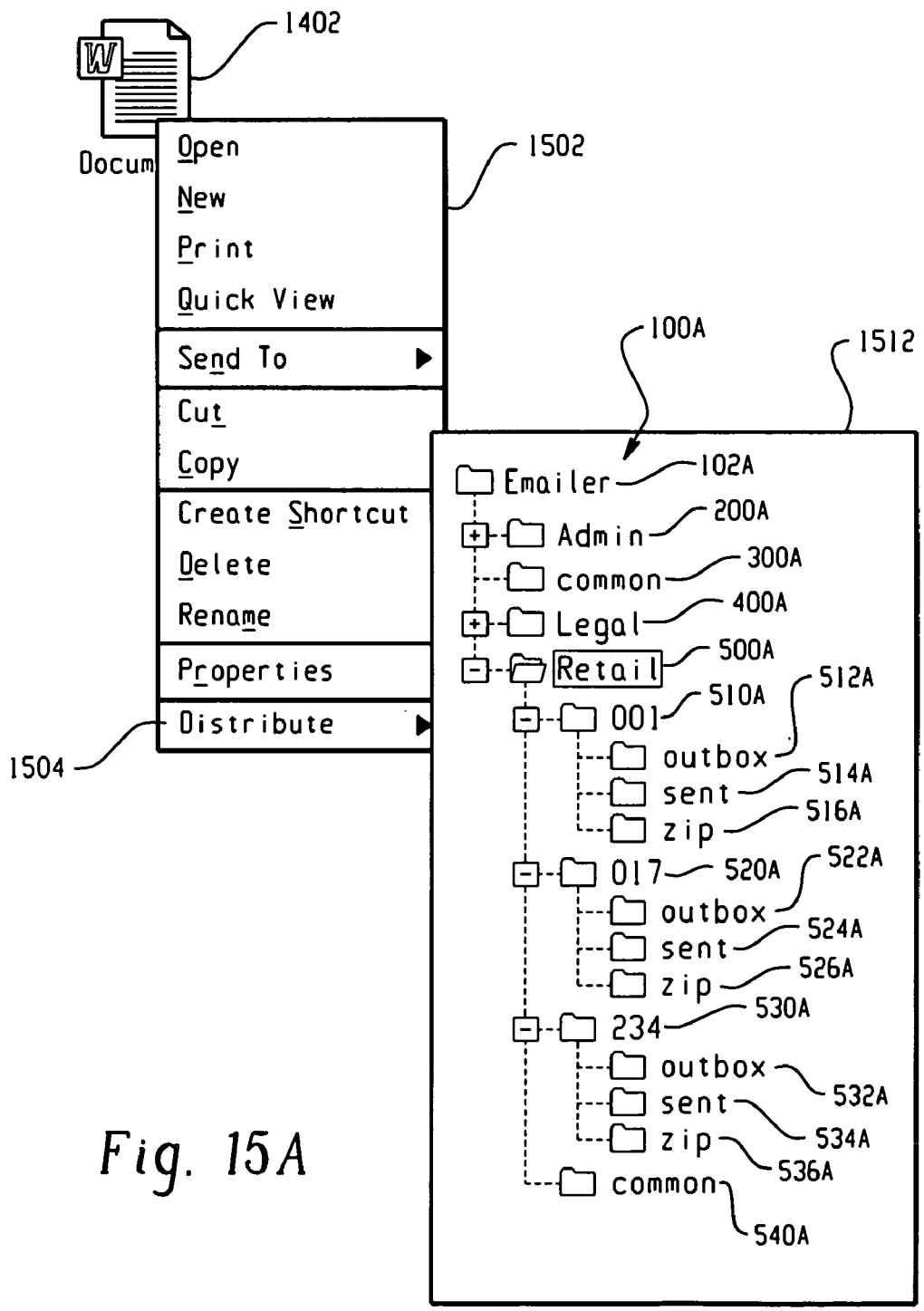
FIG. 15A is a desktop screen shot depicting a pop-up menu for selectively e-mailing a file in accordance with the present invention, the pop-up displaying a partial directory structure of a linked hierarchy based on the user defined information contained in the record table.

As shown in FIG. 4, recipient subdirectory 510 has an empty outbox 512. To prepare a document for sending to the recipient identified by identification number 001, i.e., "John Smith," file1.txt 701 is placed in outbox 512, as shown in FIG. 5. File1.txt 701 is placed in outbox 512 either by a conventional drag and drop off a desktop, through a GUI interface of the present invention, or by selecting the file and right-clicking a pop-up menu option, which displays a miniature pop-up directory structure 100 on the desktop, as discussed with reference to FIGS. 15A and 15B. Files in outbox 512 will only be sent to the recipient identified by identification number 001, since recipient subdirectory 510, corresponding to recipient 001, is the parent directory of outbox 512.

Figure 6:
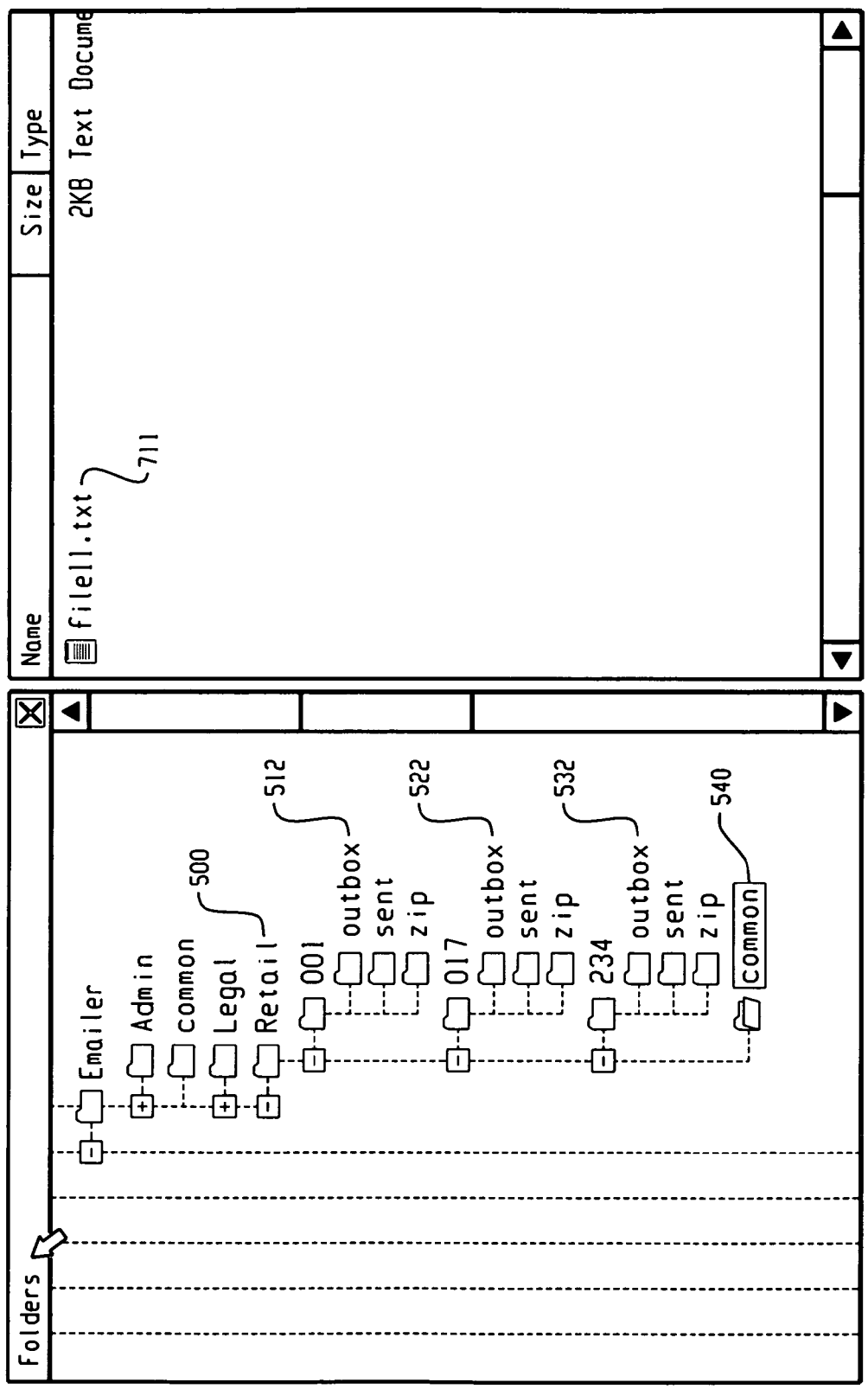
FIG. 6 is an expanded view of the directory structure of FIG. 3 showing a pending file in a common class outbox corresponding to a retail class recipient.
Figure 7:
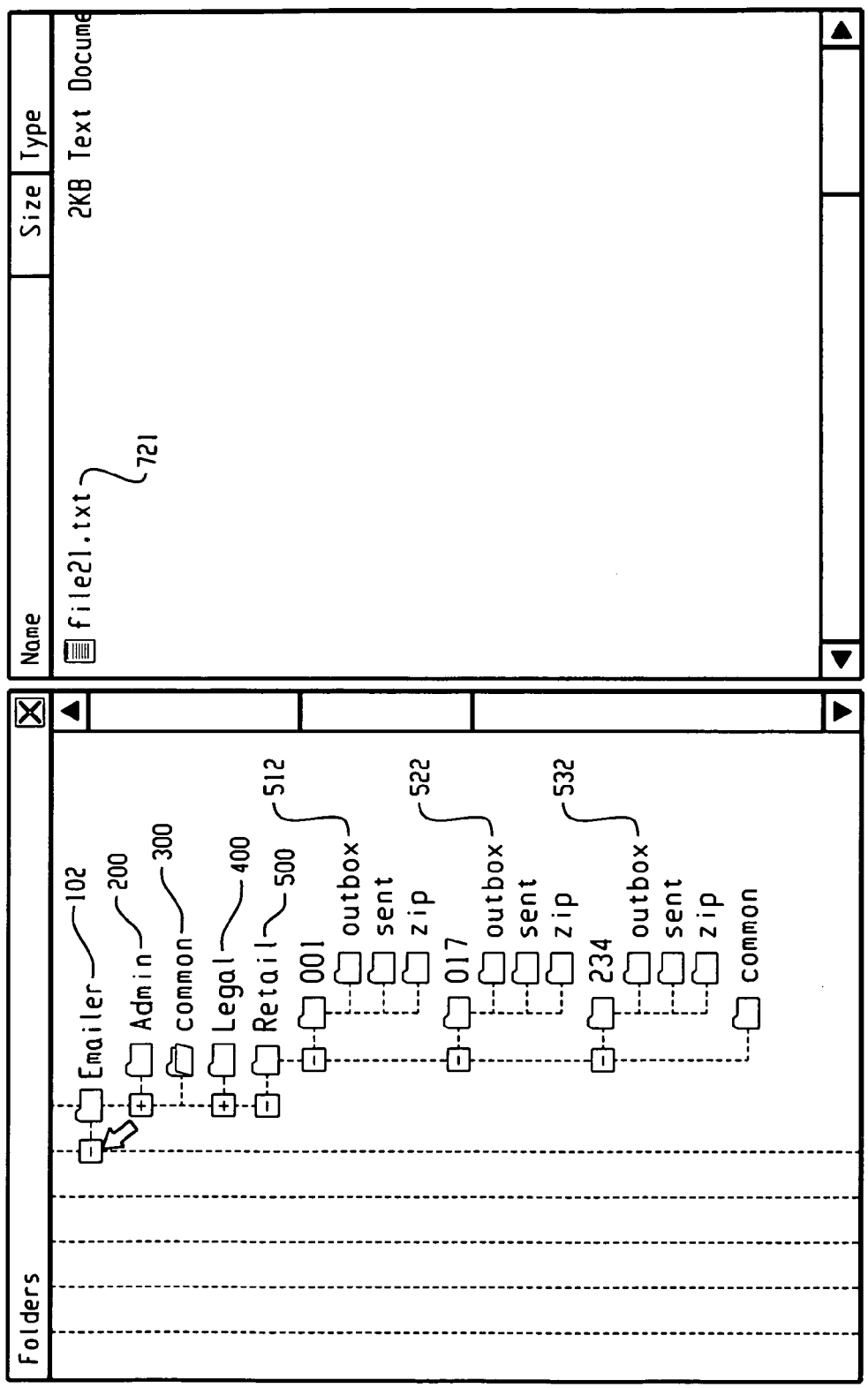
FIG. 7 is an expanded view of the directory structure of FIG. 3 showing a pending file in a common outbox corresponding to all class recipients.

To prepare a document for sending to all recipients associated with the class "RETAIL," file11.txt 711 is placed in common class outbox 540, as shown in FIG. 6. Files in common class outbox 540 will be sent to all recipients in the class "RETAIL," since subdirectory 500, corresponding to class RETAIL, is the parent directory of common class subdirectory 540. To prepare a document for sending to all recipients in all classes, file21.txt 711 is placed in common outbox 300, as shown in FIG. 7. Files in common outbox 300 will be sent to all recipients in all classes, since Emailer directory 102 is the parent of class directories Admin 200, Legal 400 and Retail 500.

Once all files are placed in the appropriate directories, the user selects the menu option "Zip All Files and Mail" 13 (FIG. 1). Invoking this option causes all files contained in common subdirectories to be copied to corresponding recipient outboxes, creating a recipient data set in each recipient outbox. Each recipient data set includes only the data sets associated with that recipient. Thus, file11.txt 711, placed in common class outbox 540, is copied to all individual recipient outboxes 512, 522, and 532 corresponding to recipients 001, 017 and 234 of class "RETAIL." Similarly, file21.txt 711, which is in common outbox 300, is copied into all recipient outboxes, i.e., file21.txt is copied from the common subdirectory 300 to recipient outbox subdirectories 512, 522, and 532, and to similar recipient outbox subdirectories not shown in the LEGAL and ADMIN classes. Thus, the outbox directory 512 of the recipient identified by identification number 001, contains files file1.txt, file11.txt and file21.txt after the common files have been copied. These recipient data sets are now ready to be sent to the recipients. After copying, files in the common directories are erased.

Figure 9:
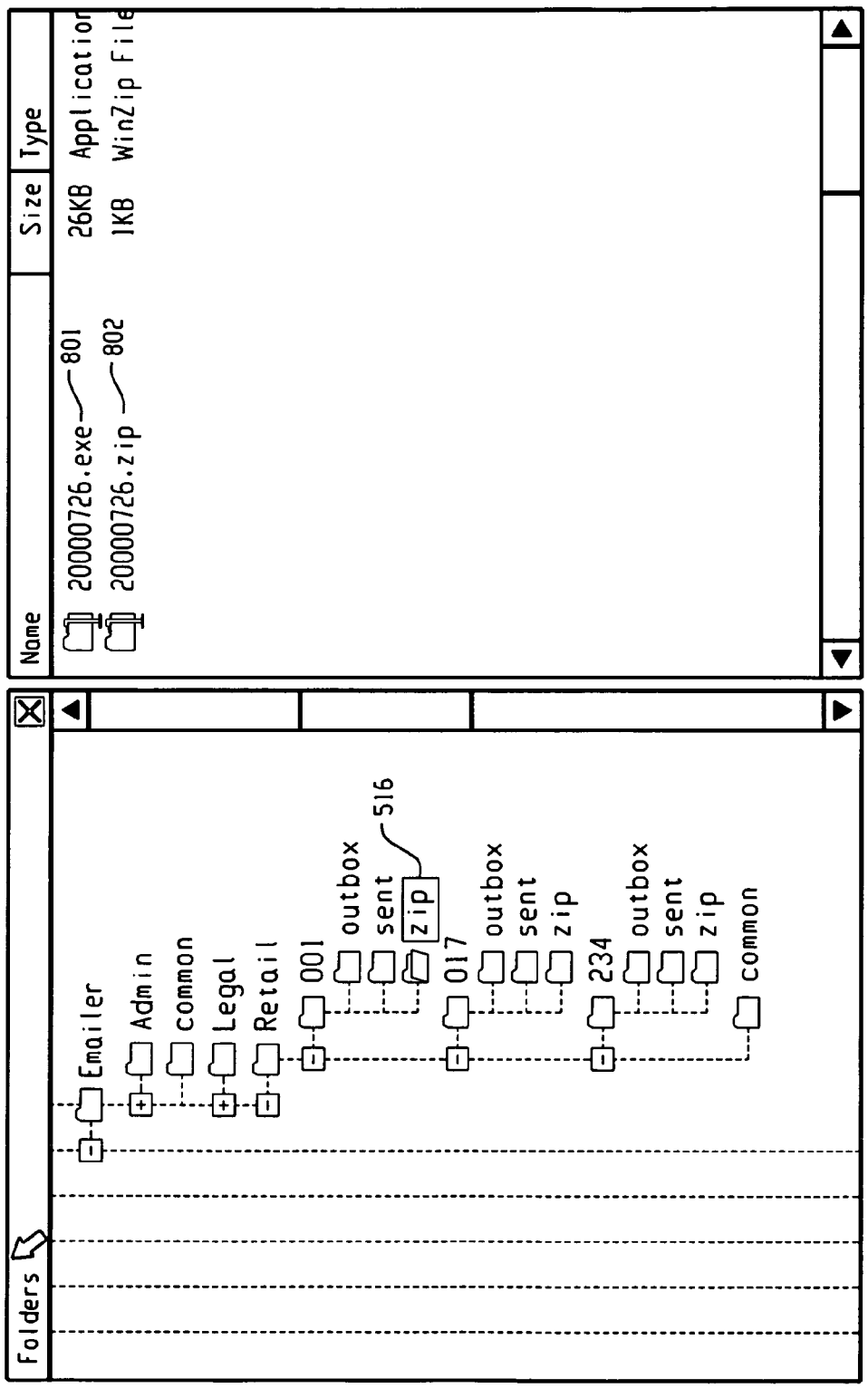
FIG. 9 is an expanded view of the directory structure of FIG. 3 showing the compressed files resulting from invoking a mailing routine.

After the appropriate files are placed in the outbox directories, a compression routine compresses the files in each outbox directory into a single compressed file for sending to the recipient via e-mail. The exemplary embodiment of the invention invokes a user-specified e-mailing program to send the compressed files. The compression routine reduces file size, conserving system bandwidth, and reduces the number of e-mails received by the recipient. In the illustrative embodiment, as shown in FIG. 9, a commercially available WinZip utility is used. One of ordinary skill in the art will appreciate, however, that any equivalent compression routine may be used in accordance with the invention. The compression routine creates two files, a self-extracting file 801, and compressed, non-self-extracting file 802.

The files are stored in the zip subdirectory 516 for the user identified by identification number 001. Preferably, the self-extracting file 802 is sent to the recipient, whereupon receiving the file the recipient simply executes the self-extracting file 802 to decompress and receive files file1.txt, file11.txt and file21.txt. The non-self-extracting file 802 is used to archive sent files on the user's computer. The filenames of the compressed files 801 and 802 are automatically generated by a user-defined scheme. In the illustrative example, the filename is reflective of the year, month and day the files were compressed and mailed, i.e., Jul. 26, 2000. Additional user-defined detail may be provided in the file name, e.g., a numeric field corresponding the number of mailings conducted during a day, and/or an additional field including the recipient's identification number. Preferably, this filename is also used as the subject line of the e-mail message so that the recipient may readily ascertain the nature of the e-mail message.

Figure 8:
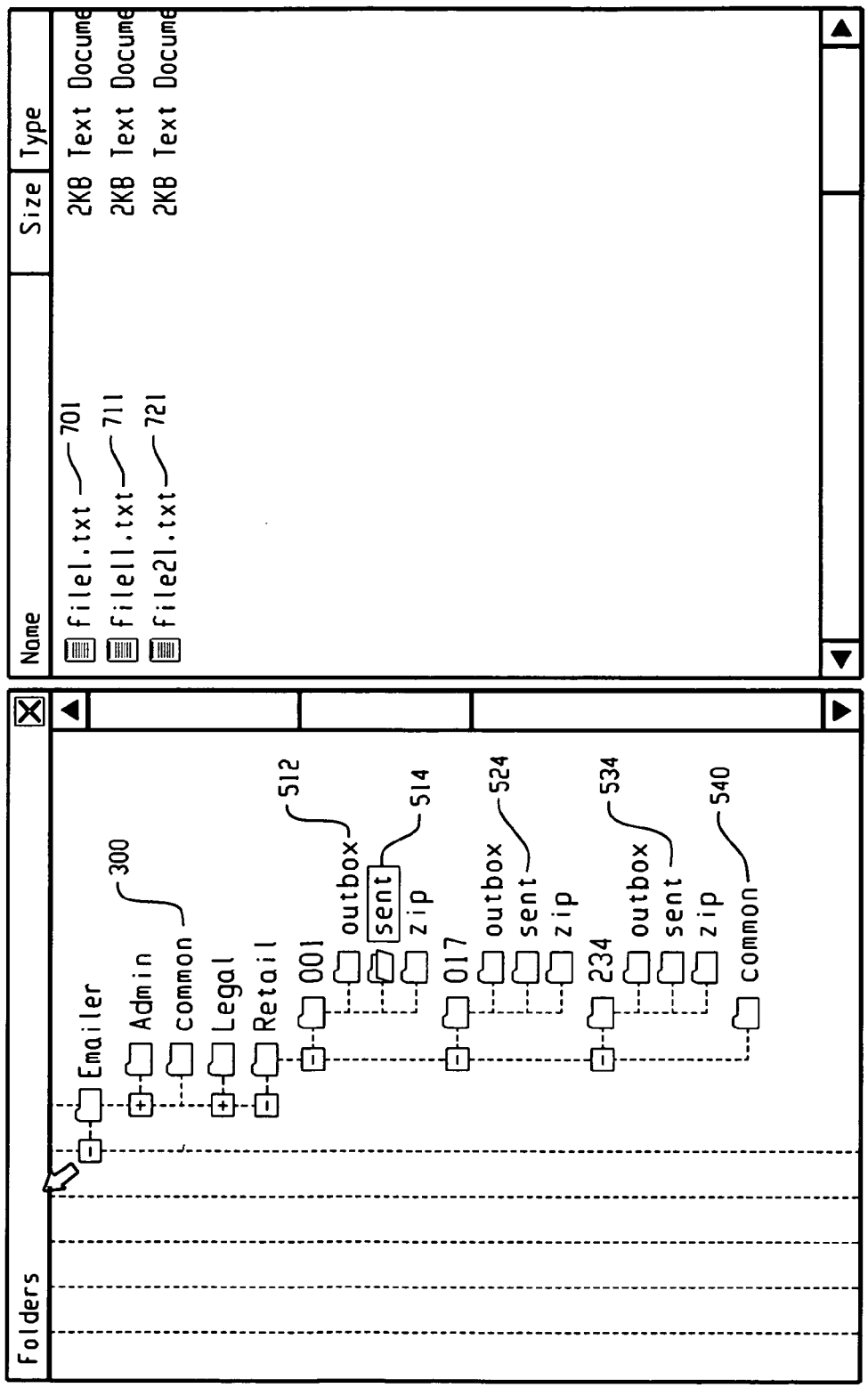
FIG. 8 is an expanded view of the directory structure of FIG. 3 showing files sent after invoking a mail program to a recipient corresponding to the recipient identification number.

Finally, after sending the compressed files, all files in recipient outboxes are moved to recipient sent subdirectories. Thus, in the example, file1.txt, file11.txt and file21.txt are moved from outbox 512 to subdirectory sent 514, as shown in FIG. 8.

Completion of the e-mail routine results in eight separate e-mail messages containing three different recipient data sets. According to record table 30, the user identified by identification number 001 will receive a recipient data set of files file1.txt, file11.txt, and file21.txt, the users identified by identification numbers 017 and 234 will receive a recipient data set of files file11.txt and file21.txt; and the users identified by identification numbers 11, 137, 138, 256, and 311 will receive a recipient data set of file file21.txt.

If numerous mailings have been conducted, the likelihood of duplicate file names in the sent directories increases. Accordingly, another embodiment of the invention includes automatically modifying the filenames of the files moved to the sent directories if a file with the same name already exists in the sent directory.

In an alternative embodiment of the invention, the automated mailing routine is invoked at predetermined time intervals. By selecting the menu option Change System Configuration 19, the user may schedule when a mailing operation will occur. Thus, if a user commonly sends large amounts of data to many recipients daily, it is more efficient to conduct one mailing after the close of business for that day. Accordingly, an evening mailing is scheduled, thereby providing recipients with one data file containing an entire day's mailing data rather than several mailings throughout the day. The scheduling utility simplifies the sender's tasks and eliminates numerous e-mail messages received by the recipient.

Selecting "Clear All Sent Folders" 14 deletes all files contained in all sent subdirectories within the main Emailer directory 102. In an alternative embodiment, this menu option is automatically invoked after mailing the compressed files to recipients.

Selecting menu option "Delete All Zip Files" 15 deletes all zip files stored in all zip subdirectories. In an alternative embodiment, the zip files are moved to an archival subdirectory for storage.

Selecting menu option "Show Folders Not On File" 16 reconciles directory structure 100 with recipient data contained in record table 30. Thus, if a new recipient is added in record table 30, this menu option will generate an appropriate recipient subdirectory in the appropriate class. Likewise, if a recipient is deleted from record table 30, this menu option will delete the corresponding recipient subdirectory.

Selecting menu option "Distribute Files to Folder" 17 distributes files with user-defined naming conventions to a recipient folder. Illustratively, a user-defined naming convention based on a recipient identification number in a filename will distribute any file into the appropriate recipient directory. Thus, any filename beginning with "001" will be moved or copied to recipient subdirectory 510, corresponding to the recipient identified by identification number 001. Alternatively, the user-defined naming convention can search for the substring "001" anywhere in the filename.

Figure 10:
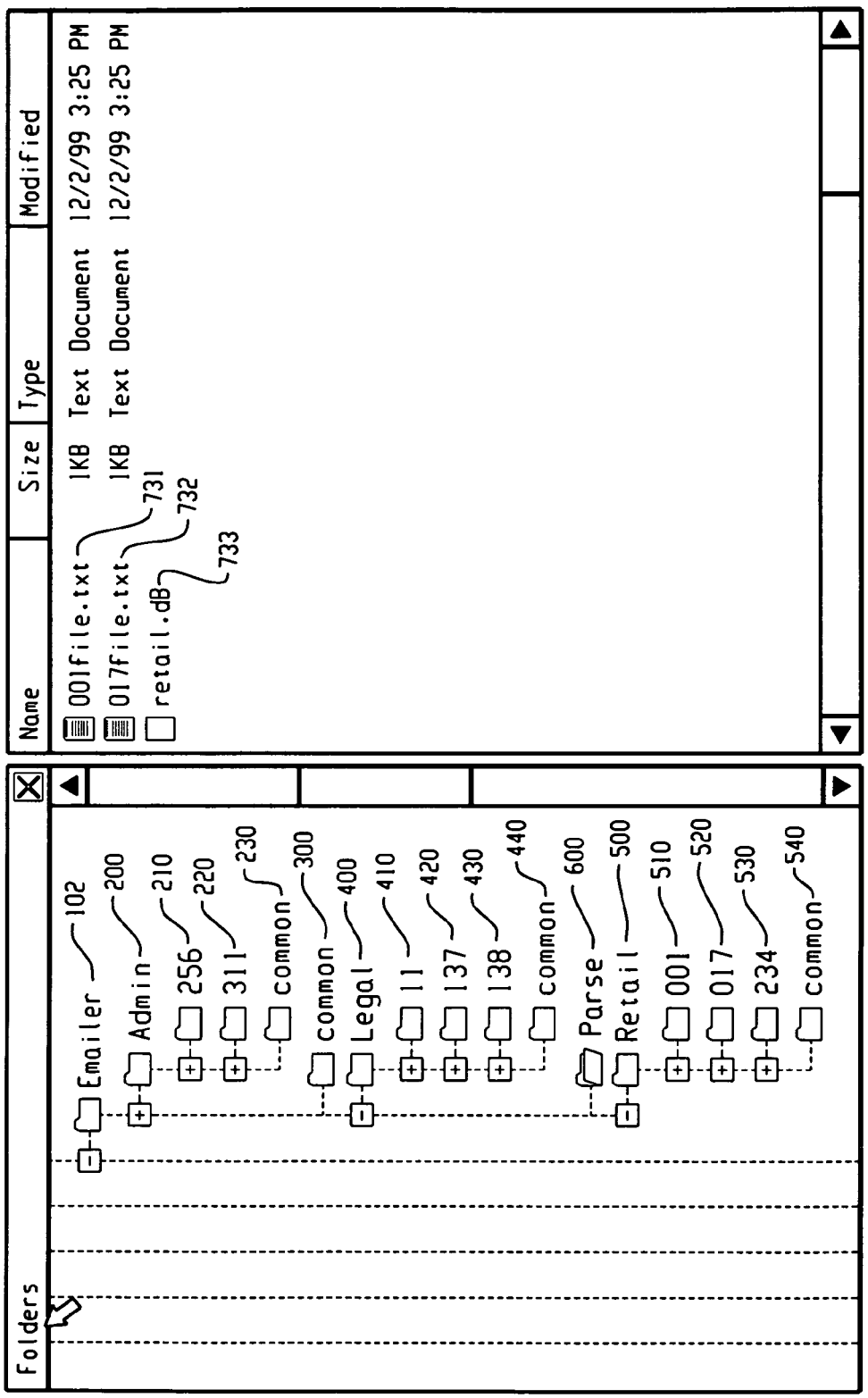
FIG. 10 is an alternative embodiment of the invention that includes a parse directory, and depicts a partial directory structure of a linked hierarchy based on the user defined information contained in the record table.

Illustratively, menu option "Distribute Files to Folder" 17 invokes a parsing routine that acts on files stored in subdirectory parse 600, as shown in FIG. 10. Files 001file.txt 731 and 017file.txt 732 are stored in subdirectory parse 600. Menu option "Distribution Files to Folder" 17 moves file 001file.txt 731 to outbox 512 of recipient subdirectory 510, corresponding to the recipient identified by identification number 001. Likewise, file 017file.txt 732 is moved to outbox 522 of recipient subdirectory 520, corresponding to the recipient identified by identification number 017.

Figure 11:
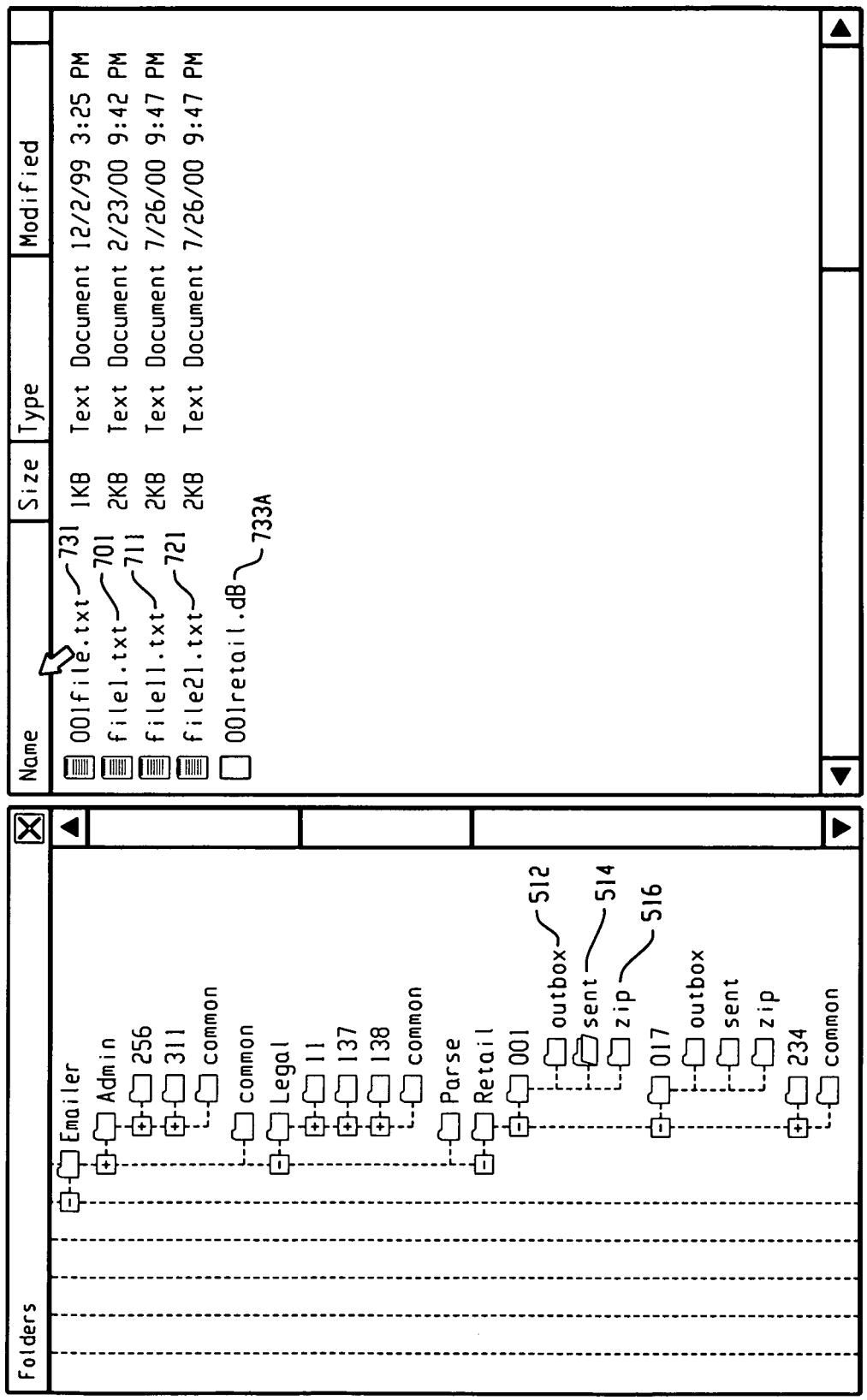
FIG. 11 is an expanded view of the directory structure of FIG. 10 showing files sent to a recipient corresponding to a recipient identification number, after invoking a parsing routine and mailing routine.
Figure 12:
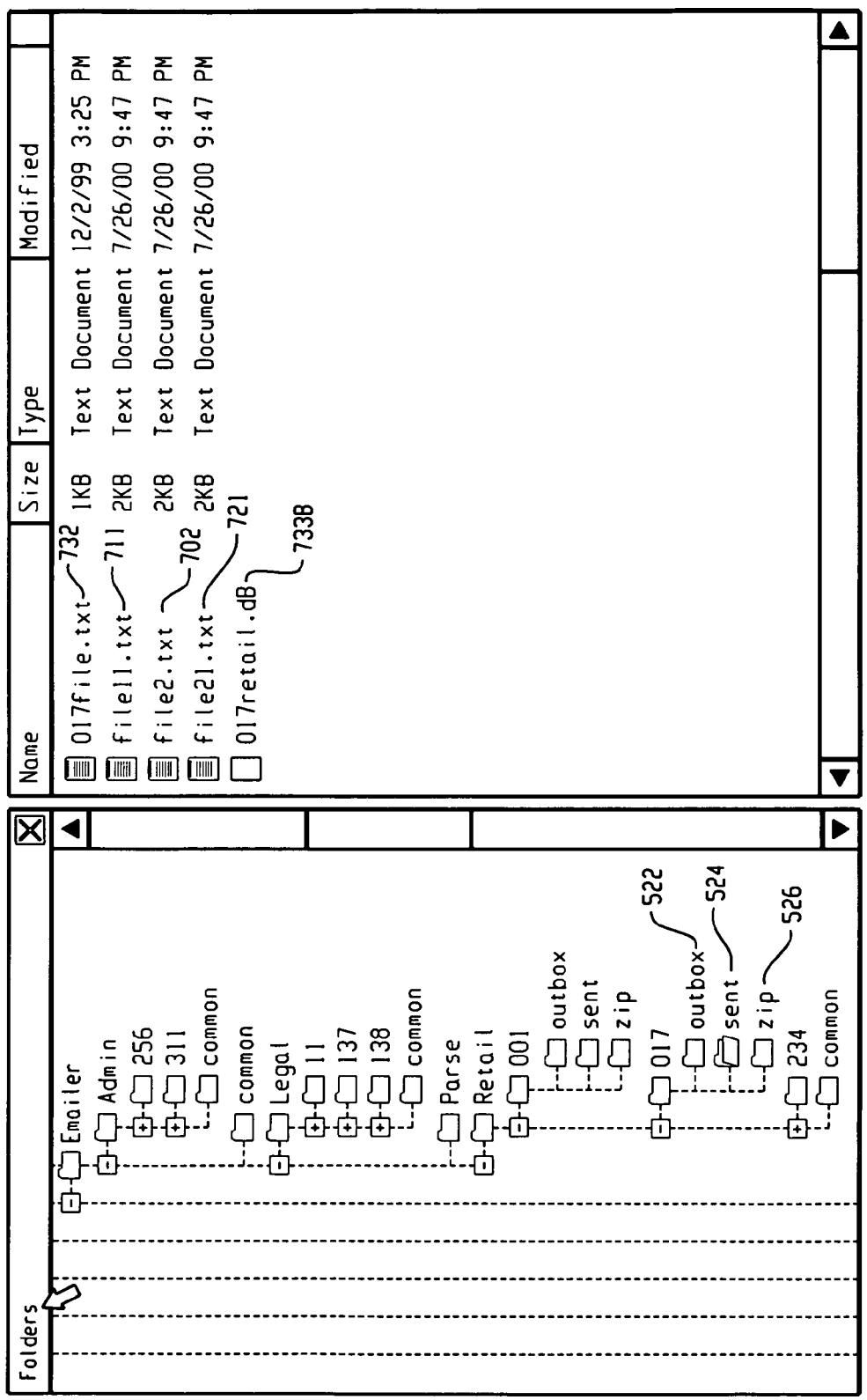
FIG. 12 is an expanded view of the directory structure of FIG. 10 showing files sent to another recipient corresponding to another recipient identification number, after invoking a parsing routine and mailing routine.

After invoking the "Zip All Files and Mail" menu option 13, a compression routine compresses the files into a single compressed file for sending to the recipient via e-mail. The exemplary embodiment of the invention invokes a user-specified e-mailing program to send the compressed files. Finally, after sending the compressed files, all files in recipient outboxes are moved to recipient sent subdirectories. Thus, in the example, file1.txt, file11.txt, file21.txt and 001file.txt are moved from outbox 512 to subdirectory sent 514, as shown in FIG. 11. Likewise, file2.txt, file11.txt, file21.txt and 017file.txt are moved from outbox 522 to subdirectory sent 524, as shown in FIG. 12.

Additionally, the user-defined naming convention can also be based on a recipient class. Thus, a file in subdirectory parse 600 containing a class string in the filename is sent to all recipients corresponding to that class.

In yet another embodiment, the menu option "Distribute Files to Folder" 17 invokes a database routine that opens a target database stored in subdirectory parse 600 and automatically generates data files containing data keyed to the recipient's identification number. Illustratively, target database retail.db 733 includes weekly sales totals for all recipients in class "RETAIL," i.e., recipients identified by identification numbers 001, 017, and 234. The parse routine opens the database retail.db 733, and collects sales data for each recipient identified by identification numbers 001, 017, and 234. Corresponding data are copied to in file 001retail.db 733A for the recipient identified by identification number 001, and in file 017retail.db 733B for the recipient identified by identification number 017. File 001retail.db 733A is created in outbox 512 of recipient subdirectory 510, corresponding to the recipient identified by identification number 001, and file 017retail.db 733B is created in outbox 522 of recipient subdirectory 520, corresponding to the recipient identified by identification number 017. After invoking the "Zip All Files and Mail" menu option 13, file 001retail.db 733A is moved to subdirectory sent 514, as shown in FIG. 11. Likewise, file 017retail.db 733B is moved to subdirectory sent 524, as shown in FIG. 12.

Selecting menu option "Open GUI Distribution Interface" 18 invokes a graphical user interface associated with the invention. The GUI is described above with reference to the exemplary embodiment of the invention, or, alternatively, the GUI is implemented by common computer navigation software, such as Windows Explorer.

Selecting menu option "Change System Configuration" 19 allows the user to change various system configurations associated with the invention. Under this option, the user schedules the frequency of automated mailings; the default e-mail program invoked by the invention; user-defined file naming conventions; and archival directories for storing compressed mail files.

Selecting menu option "Exit" 20 exits the program associated with the invention.

Figure 13:
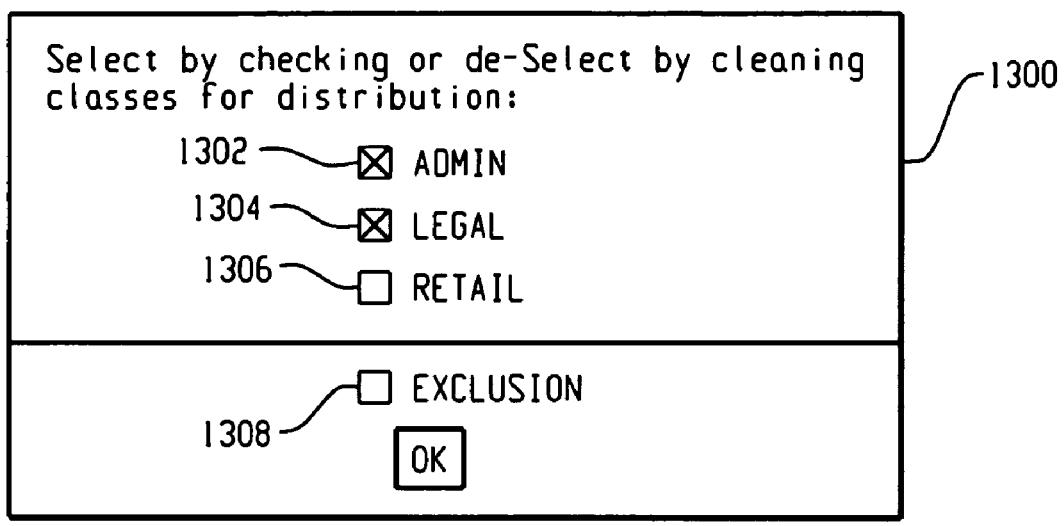
FIG. 13 depicts a pop-up menu for selectively distributing files according to a parent-child subdirectory relationship.

A further embodiment of the invention includes selectively distributing files according to a parent-common subdirectory relationship. For example, if a user desires to send a file to all recipients in classes "ADMIN" and "LEGAL," and omit recipients in class "RETAIL," the user may selectively distribute the file by placing the file in the common subdirectory 300, rather than placing the same file in common class subdirectories 230 and 440. This is accomplished by defining the distribution parameters when the file is placed in common subdirectory 300. A pop-up menu 1300 showing distribution parameters automatically appears upon placing a file in the common subdirectory 300. Thus, the user is queried as to which class subdirectories are not to receive the file. In this example, the user deselects the "RETAIL" select box 1306, as shown in FIG. 13. As "ADMIN" and "LEGAL" select boxes 1302 and 1304 remain selected, the file is distributed to all recipients in the ADMIN and LEGAL classes.

As the distribution hierarchy increases in size, more classes appear in pop-up menu 1300. Selection of EXCLUSION select box 1308 toggles the distribution parameters of pop-up menu 1300. Thus, selection of EXCLUSION select box 1308 results in the file being distributed to only the non-selected classes. Accordingly, if the EXCLUSION select box 1308 is selected, the file is distributed only to the RETAIL class.

It is readily apparent to one or ordinary skill in the art that the invention is not limited to the exemplary embodiments described herein. For example, alternative embodiments include recipient names on recipient subdirectories, multiple class hierarchies, i.e., classes within classes, such as "RETAIL-WEST", "RETAIL-EAST", etc.

Figure 14A:
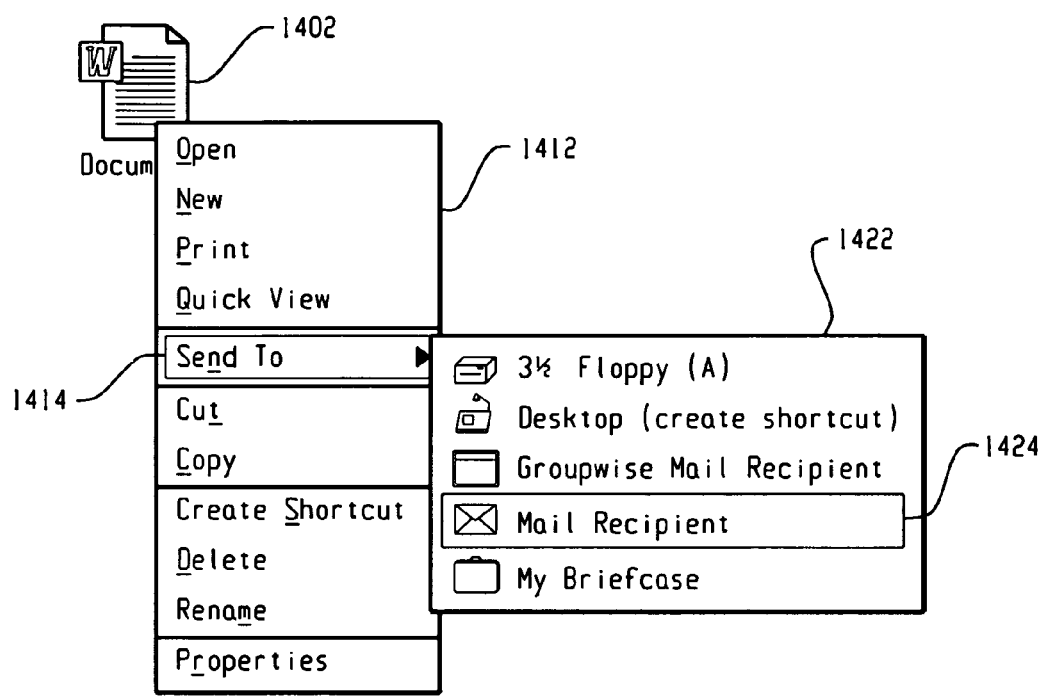
FIG. 14A is a desktop screen shot depicting a pop-up menu for selectively e-mailing a file in accordance with prior art systems.
Figure 14B:
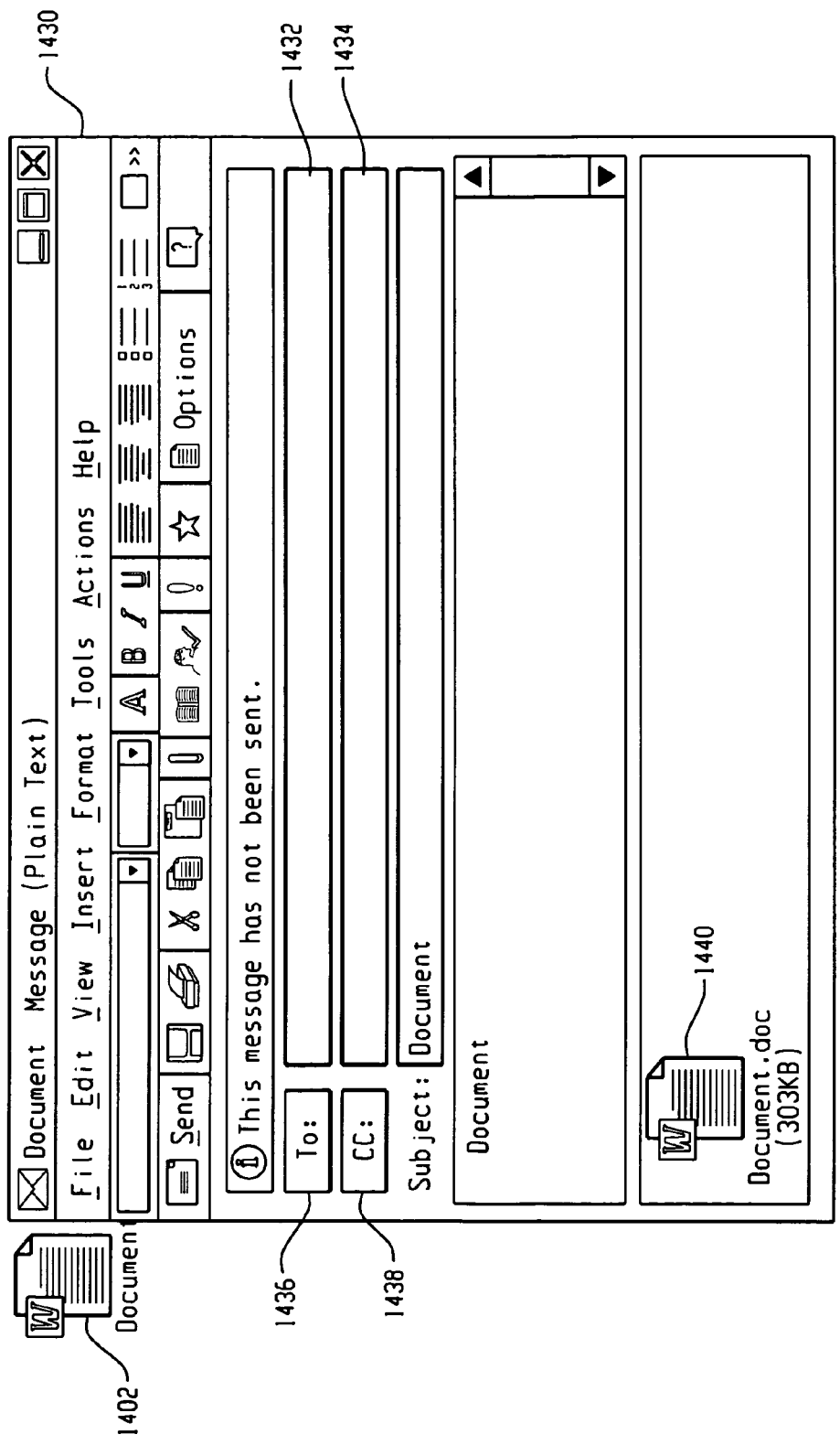
FIG. 14B is a desktop screen shot depicting an e-mail application window invoked from a pop-up menu selection in FIG. 14A.

Another exemplary embodiment of the invention includes selectively distributing a file by use of a conventional right-click pop-up menu. In prior art systems, files can be selectively distributed via e-mail by use of a standard right-click pop-up menu as shown in FIG. 14A. File 1402 is selected and a right-click pop-up menu 1412 is brought up via activation of a mouse button. "Send to" option 1414 is selected, bringing up a selection menu 1422. Selection of "Mail Recipient" option 1424 activates a common e-mail application window 1430, as shown in FIG. 14B. Recipients must be addressed via address fields 1432 and 1434, and individual addresses or groups can be browsed via "To" button 1436 and "CC:" button 1438. A copy of file 1402 is attached as document 1440 in the e-mail message. Accordingly, in prior art systems, the sender of the message must choose from a list of e-mail addresses to select recipients or groups, and send multiple e-mails if the sender desires to send additional data files to different recipients.

The present invention, however, includes the directory structure of the linked hierarchy based on the user defined information contained in record table 30, as shown in FIG. 15. File 1402 is selectively distributed by use of a right-click pop-up menu 1502. Pop-up menu 1502 has additional "Distribute" option 1504, selection of which brings up selection menu 1512, which contains directory Emailer 102A, and its associated directory structure 100A. Directory structure 100A operates in a similar fashion as directory structure 100 described with reference to FIGS. 3–7 above. Accordingly, selecting subdirectory common 540A will distribute the selected file to recipient subdirectories 510A, 520A and 530A. Thus, as a user works throughout a work day, the user can selectively prepare files for distribution to a plurality of recipients easily and quickly. Accordingly, once the user decides to mail the files to the recipients, the user selects the menu option "Zip All Files and Mail" 13, which invokes the mailing routine described with reference to FIGS. 3–9 above.

Figure 15B:
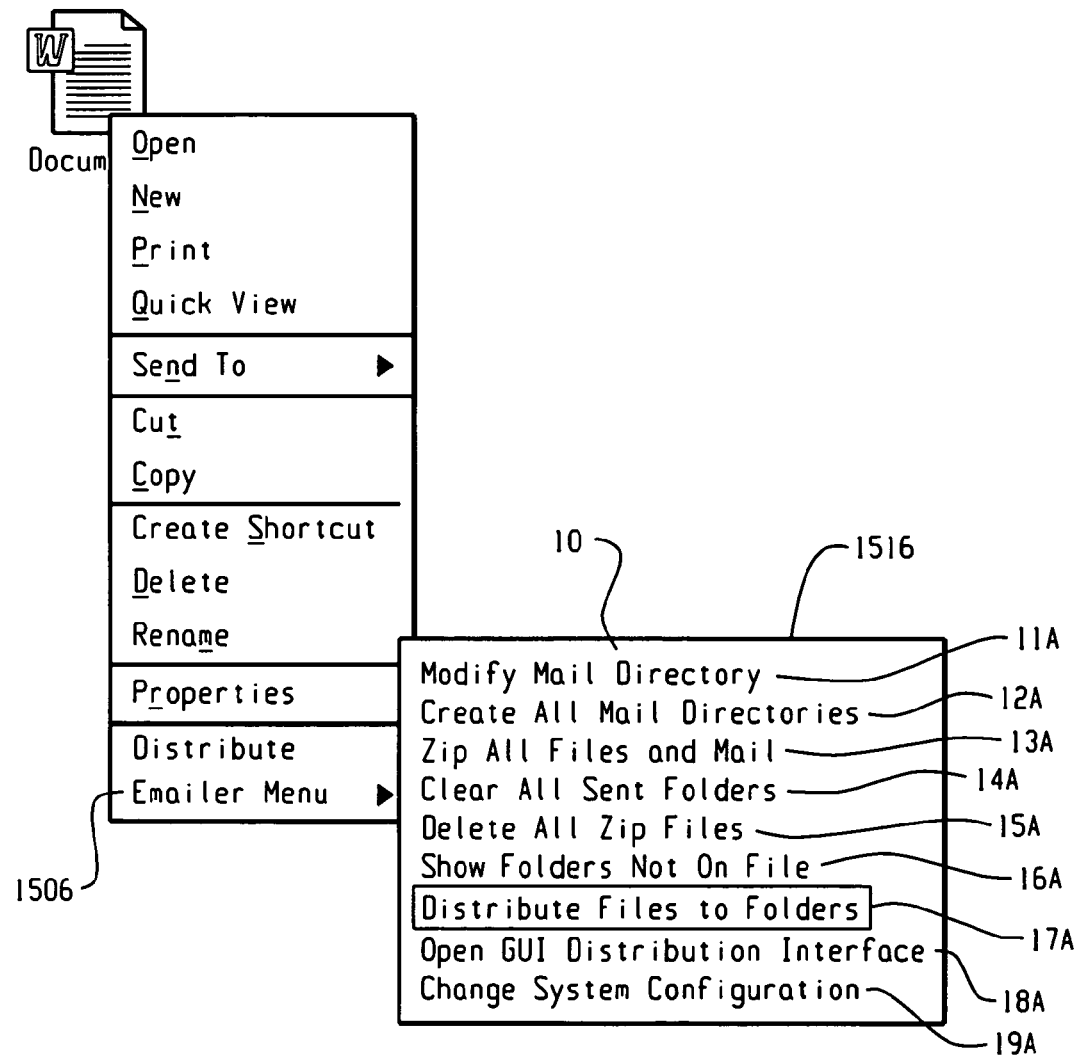
FIG. 15B shows a main software menu associated with the invention, the main software menu provided via a standard pop-up menu.

Main software menu 10 is also provided via a pop-up menu, as shown in FIG. 15B. "Emailer Menu" option 1506 is selected, bringing up a selection menu 1516. Selection menu 1516 provides menu options Modify Mail Directory 11A, Create All Mail Directories 12A, Zip All Files and Mail 13A, Clear All Sent Folders 14A, Delete All Zip Files 15A, Show Folders Not on File 16A, Distribute Files to Folder 17A, Open GUI Distribution Interface 18A, and Change System Configuration 19A. Menu options 11A–19A operate in the same manner as menu options 11–19 as previously described with reference to main software menu 10 of FIG. 1.

Figure 16:
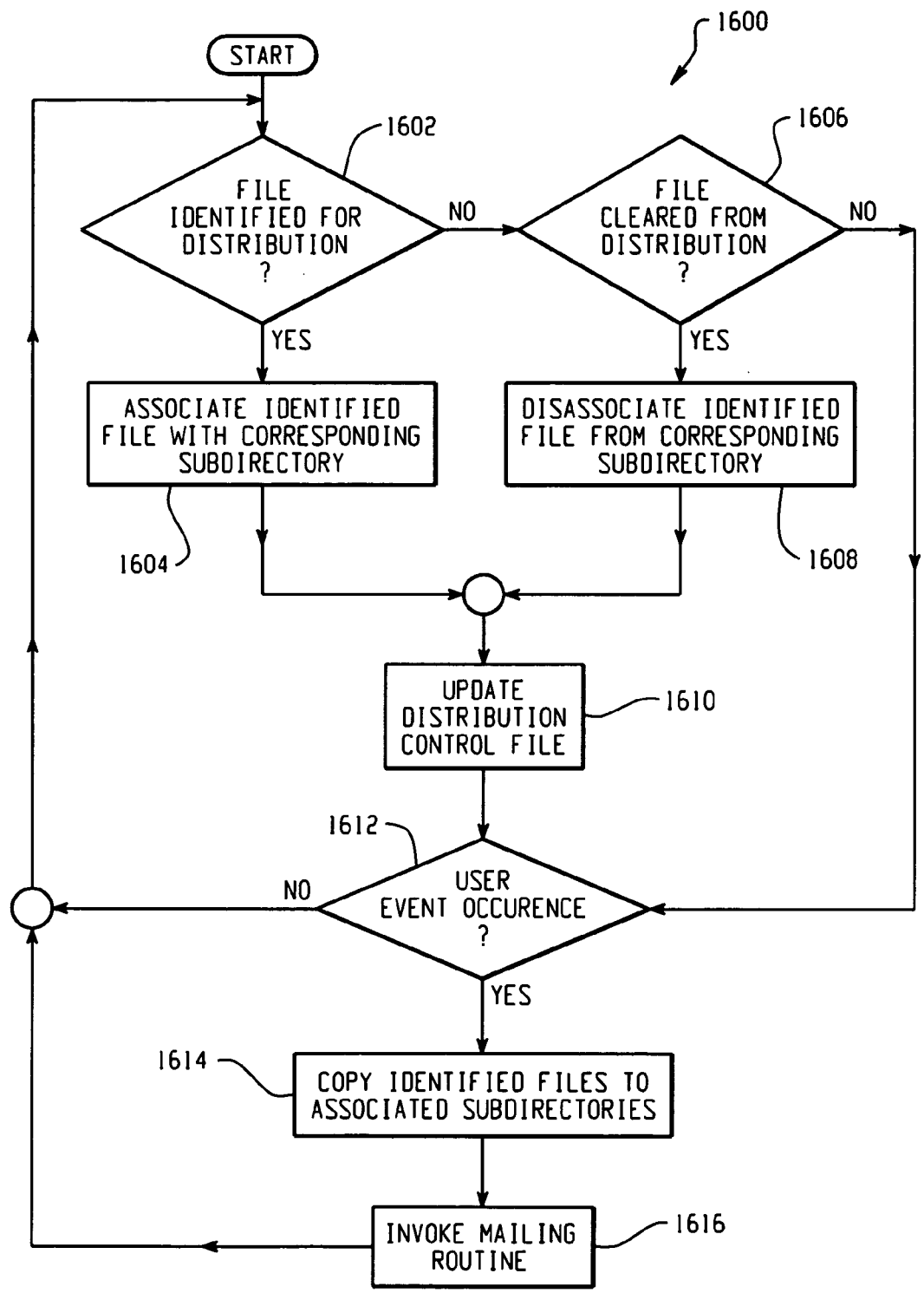
FIG. 16 is a flow diagram illustrating a process for distributing files identified for distribution upon the occurrence of a user defined event.

In another embodiment of the invention, files identified for distribution in a distribution control file are periodically distributed upon the occurrence of a user defined event. FIG. 16 includes a flow diagram 1600 describing a process for periodically distributing files identified for distribution upon the occurrence of the user defined event. In step 1602, the system determines whether a file has been identified for distribution. If a file has been identified for distribution, the file is associated with a corresponding subdirectory in step 1604 (e.g., a common subdirectory or a recipient subdirectory). The association of the file with the corresponding subdirectory is recorded in a distribution control file in step 1610. Preferably, the distribution control file includes a target address for the identified file, and a target address for the corresponding subdirectory.

If a file has not been identified for distribution, the system determines whether the file has been cleared from distribution in step 1606. If the file has been cleared from distribution, the file is disassociated from the corresponding subdirectory in step 1608. Accordingly, in step 1610 the distribution control file is updated to reflect the disassociation of the identified file from the corresponding subdirectory. In step 1612, the system determines whether a user defined event has occurred. If no user defined event has occurred, the system continues to monitor files identified for distribution or cleared from distribution, as previously described with reference to step 1602 and 1606 above. If the user defined event has occurred, step 1614 copies all identified files to their associated subdirectories. The step is accomplished by reading the distribution control file, determining the target addresses of identified files, and determining the target addresses of corresponding subdirectories. The identified files are then copied from their target addresses to the corresponding subdirectories. After the files are copied to their associated subdirectories, step 1616 invokes a mailing routine which then distributes the files to the recipients. The mailing routine is similar to the routine described with reference to the "Zip All Files and Mail" menu option 13 described above. Invoking this option causes all files contained in common subdirectories to be copied to corresponding recipient outboxes. After the appropriate files are placed in the outbox directories, the compression routine compresses the files of each outbox into a single compressed file for that outbox for sending to the recipient via e-mail.

Files identified for distribution are thereafter distributed to recipients during each occurrence of the user defined event. Illustratively, a user defined event may occur upon the expiration of a time period, such as daily, weekly or monthly time periods. Thus, a file identified for distribution is automatically distributed to the recipients on a daily, weekly or monthly basis. Accordingly, files which are updated on a periodic and frequent basis, such as sales reports, test and evaluation data, etc., are automatically distributed to recipients without the user having to invoke a mailing routine, or address and send the file to each individual or recipient. Thus, recipients receive timely and accurate information from the user, via a mailing/distribution process which is transparent to the user.

Figure 17A:
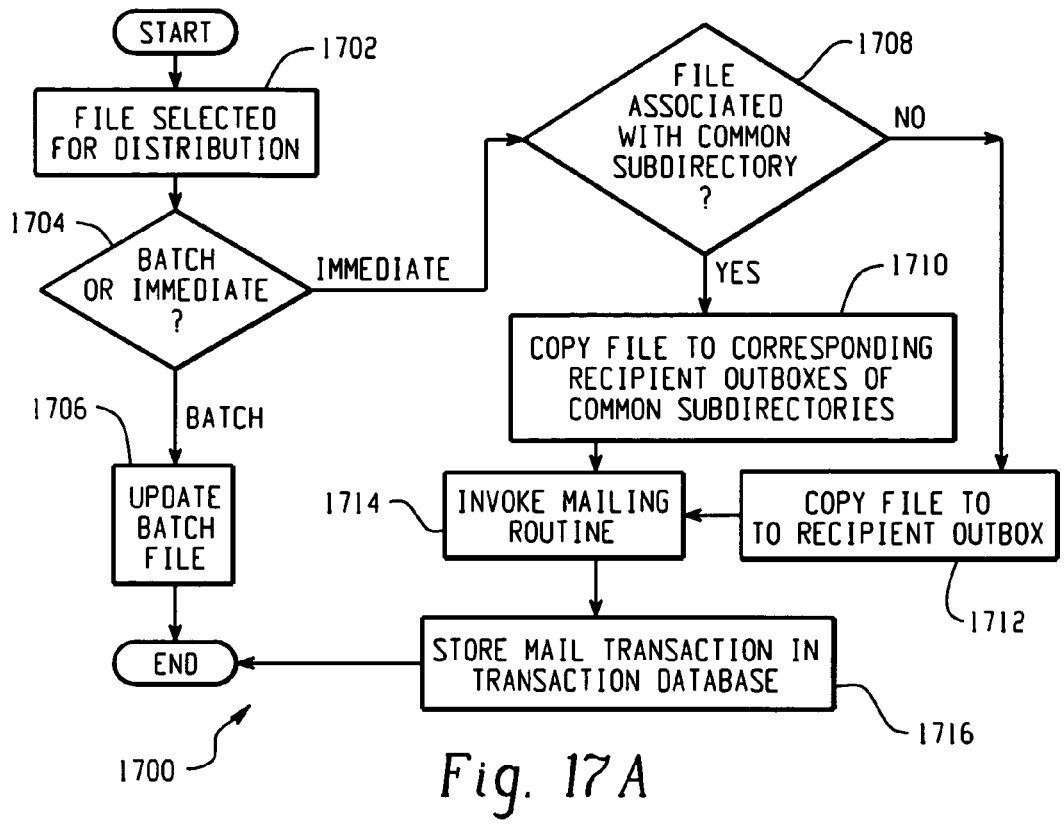
FIG. 17A is a flow diagram illustrating a process for distributing files according to a batch distribution mode and an immediate distribution mode.
Figure 17B:
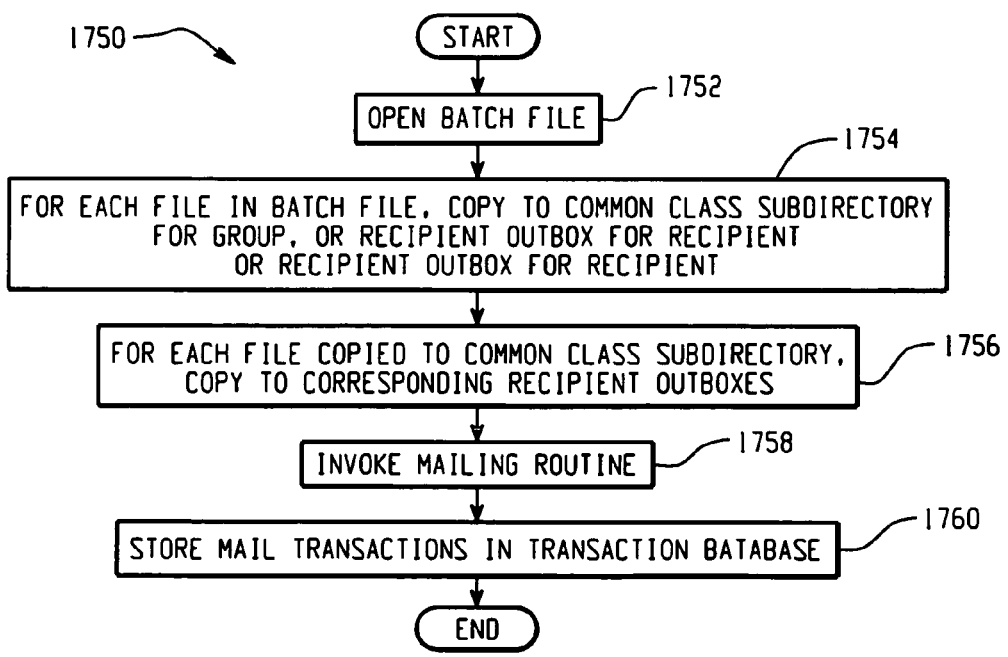
FIG. 17B is a flow diagram illustrating a process for distribution files according to a batch process in a batch distribution mode.

In another embodiment of the invention, the information distribution system is selected for batch or immediate distribution mode. Selection of an immediate distribution mode results in the file being immediately distributed and e-mailed when the file is selected for distribution. On the other hand, selection of a batch distribution mode results in files being distributed only when a batch process is activated. FIGS. 17A and 17B provide flowcharts illustrating the batch distribution and immediate distribution mode processes. In step 1702, a file is selected for distribution by the user. In step 1704, the system determines whether a batch or immediate variable has been selected. If the batch variable has been selected, step 1706 updates the batch file to include the file selected for distribution. Illustratively, the batch file includes the target address of the file selected for distribution, and the target address of the corresponding subdirectory into which the selected file will be copied by the mailing routine. After step 1706 is completed, the process is complete for the batch distribution mode until the a batch distribution process is run.

However, if step 1704 determines that an immediate distribution variable has been set, the file selected for distribution is immediately distributed to its intended recipients. Step 1708 determines whether the file is associated with a common subdirectory. If the file is associated with a common subdirectory, the file is copied to the corresponding recipient outboxes of the common subdirectory in step 1710. If the file is not associated with the common subdirectory, i.e., the file is intended for one recipient, the file is copied to the recipient outbox in step 1712. In step 1714, a mailing routine is invoked and the file is mailed to its intended recipients. The mailing routine invoked is similar to the mailing routine invoked in step 1616 with respect to FIG. 16.

After the files have been mailed to their intended recipients, step 1716 stores the mail transactions in a transaction database. The transaction database provides a history of mailing transactions, including the date a file was mailed, the recipients of that file, and the mailing frequency of the file to the recipients. The mailing frequency is the number of times a file is mailed to a set of recipients over a period of time. Thus, a file mailed to a set of recipients once every week has a mailing frequency of once a week, while a file mailed to another set of recipients once a month has a mailing frequency of once per month.

Files selected for distribution when the batch variable is set are mailed upon initiation of a batch routine. FIG. 17B describes the mailing process of the batch routine. In step 1752, the batch file is opened. Each entry in the batch file associates a file located at a target address with one or more subdirectories located at one or more subdirectory addresses. Each file referenced in the batch file is copied to a common class subdirectory for a group mailing, or recipient outbox for an individual recipient mailing, as shown in step 1754. In step 1756, each file copied to a common class subdirectory is then copied to the corresponding recipient outboxes related to the common class subdirectory. After execution of step 1756, the files are distributed to the recipient outboxes. Accordingly, a mailing routine is invoked in step 1758. Finally, the mailing transactions are stored in the transaction database at step 1760.

Figure 18:
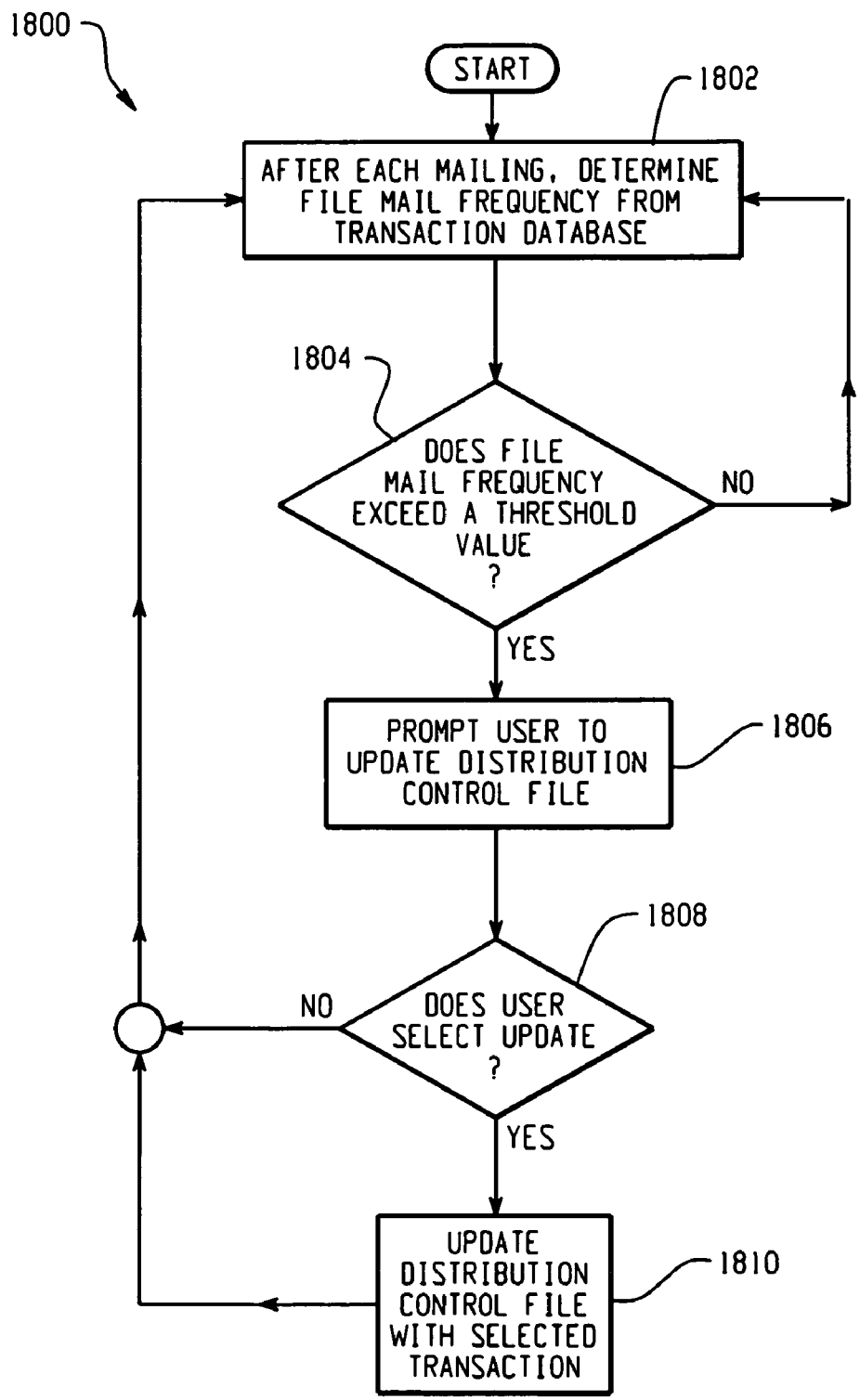
FIG. 18 is a flow diagram illustrating a process for interrogating a transaction database to determine the mailing frequency of a file to a set of users and to update system parameters based on the mailing frequency of the file.

As described above, the transaction database is used to determine the mailing frequency of a file to a user or set of users. If the mailing frequency exceeds a user defined threshold, the user is automatically prompted to update the distribution control file. Thus, the system automatically monitors the manual mailing habits of a user and determines whether those manual mailing habits should be automated through an update to the distribution control file. FIG. 18 is a flowchart for this process. In step 1802, the system determines the file mail frequency from the transaction database after each mailing. In step 1804, the system determines whether the file mail frequency exceeds a threshold value. If the file mail frequency does not exceed a threshold value, the system returns to step 1802. On the other hand, if the file mail frequency exceeds the threshold value, the system prompts the user to update the distribution control file in step 1806. As previously described with reference to FIG. 16 above, updating the distribution control file will associate a file with a corresponding subdirectory by storing a target file location and the corresponding target locations of one or more subdirectories in the distribution control file. If the user chooses to update the distribution control file in step 1808, the distribution control file is updated with the corresponding transaction in step 1810. On the other hand, if the user decides not to update the distribution control file, the system returns to step 1802 and waits to determine the file mail frequency after the next mailing.

In another embodiment, file change status is tracked in the distribution control file. File change status reflects whether a file has changed since the last time it was distributed to recipients. If a file has not changed since the last time it was distributed to recipients (e.g., no work has been done on the file and the file has not been updated), the file will not be sent to the recipients upon the occurrence of the user defined event as described with reference to FIG. 16. Conversely, if the file change status indicates that the file has changed since its last distribution to recipients, the file will be sent to its intended recipients upon the occurrence of the user defined event as described with reference to FIG. 16. Accordingly, monitoring of a file change status eliminates repetitive distribution of a file that has not changed since its previous distribution. Thus, if the user is away from the work environment for an extended period (e.g., vacation, illness, etc.), the repetitive distribution of unchanged files to their intended recipients is prevented.

Figure 19:
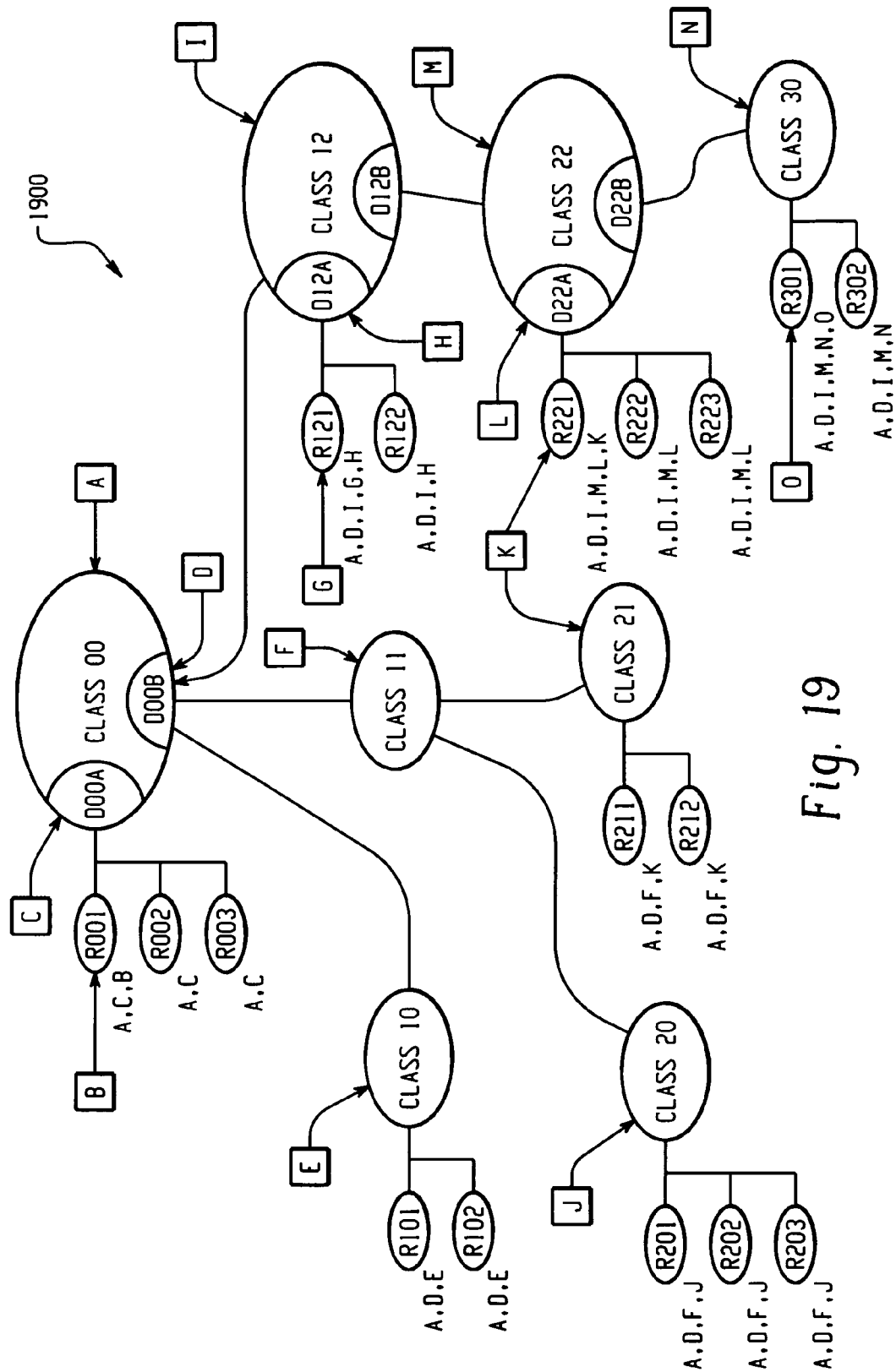
FIG. 19 is a first data distribution model further illustrating the information distribution system.

FIG. 19 provides a data distribution model 1900 further illustrating the information distribution system. Data sets are distributed according to a hierarchical class structure based on classes, subclasses, recipients, recipient nodes, and class nodes. Model 1900 includes a plurality of classes: class 00, class 10, class 11, class 12, class 20, class 21, class 22, and class 30.

A class may include individual class recipients. Individual class recipients are identified in a class recipient tree containing recipient accounts. Class 00 includes class recipients R001, R002 and R003 in class 00 recipient tree, Class 10 includes class recipients R101 and R102 in class 10 recipient tree. The remaining class recipient trees are organized in a similar manner.

A class may include a subordinate subclass. As shown in FIG. 19, classes 10, 11, and 12 are subclasses of class 00, classes 20 and 21 are subclasses of class 11, class 22 is a subclass of class 12, and class 30 is a subclass of class 22.

If a class includes class recipients and subclasses, data is distributed according to recipient nodes and class nodes. Data input directly into a class is distributed through both the recipient node and class node. Data input into a recipient node is distributed only to the individual class recipients in the class recipient tree. Data input into the class node is distributed only to the subclasses. Data input directly into a recipient is not distributed to any other recipient or class.

Class 00 includes recipient node D00A and class node D00B; class 12 includes recipient node D12A and class node D12B; and class 22 includes recipient node D22A and class node D22B.

If a class includes only individual class recipients and does not include a subclass, or if a class includes only subclasses and does not include individual class recipients, the class does not need a recipient node or a class node, as data input into the class can only be distributed in one way. Thus, classes 10, 20, 21, and 30, which have only individual class recipients and no subclasses, and class 11, which has only subclasses and does not have individual class recipients, do not show recipient nodes or class nodes. Of course, the model changes accordingly if a subclass or individual class recipient is added. Thus, if class 20 is made a subclass of class 10, class 10 will then include a recipient node and class node.

Data is input either directly into the class, into the class recipient node, into the class node, or directly to the recipient account. In class 00, data A is input directly into class 00; therefore, data A is distributed through recipient node D00A and class node D00B. Thus, recipients R001, R002 and R003 receive data A, which is also distributed to subclasses 10, 11, and 12. As data A is input directly into classes 10, 11, and 12, individual recipients R101 and R102 also receive data A. Class 11, which has only subclasses, directly inputs data A into subclasses 20 and 21. Thus, data A is also distributed to individual recipients R201, R202, R203, R211 and R212. Similarly, data A is distributed through recipient node D12A to individual recipients R121 and R122 and class node D12B of class 12 to class 22. Data A is distributed in a similar manner through classes 22 and 30. Accordingly, individual recipients R221, R222, R223, R301 and R302 also receive data A.

Data is input directly into recipient R001. Thus, recipient R001 is the only recipient to receive data B.

Data is input into recipient node D00A. Thus, recipients R001, R002 and R003 are the only recipients to receive data C.

Data is input directly into class node D00B. Thus, data is distributed in the same manner as data A as described above with respect to all subclasses of Class 00 and the corresponding recipients. Accordingly, recipients R001, R002 and R003 are the only recipients not to receive data D.

Note that data can be input into more than one location. Data K, for example, is input directly into class 21 and individual recipient R221. Thus, recipients R211, R212 and R221 receive data K.

Each recipient receives a recipient data set that includes only data associated with that recipient. Recipient data sets are represented by a subscript list adjacent to each recipient in the class recipient tree. Thus, recipient R001 receives recipient data set consisting of data A, C, B; R002, A, C; R003, A, C; R101, A, D, E; etc. A recipient will not receive data that is not associated with that recipient.

Figure 20:
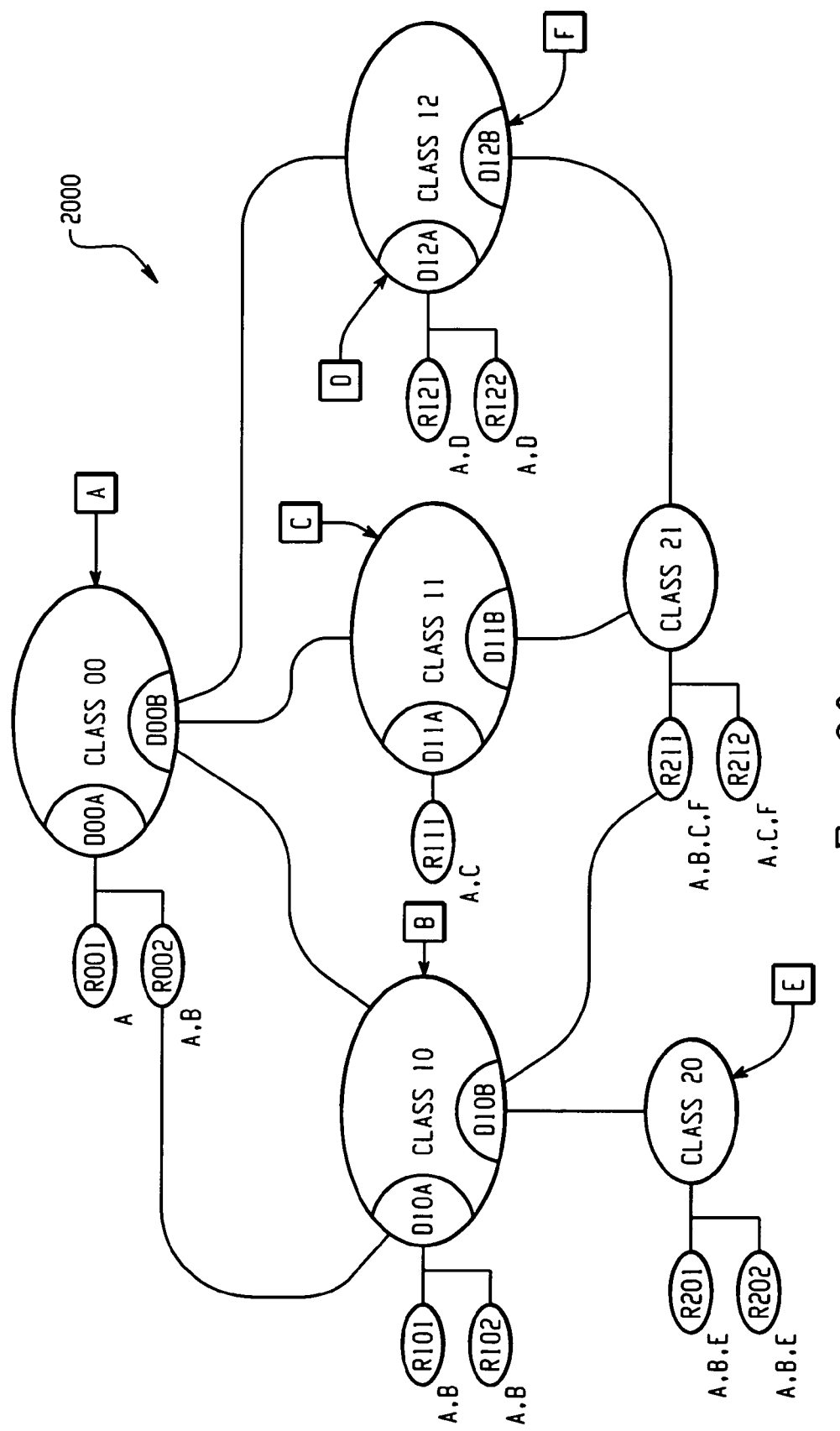
FIG. 20 is a second data distribution model further illustrating the information distribution system.

One of ordinary skill in the art will readily appreciate that the data distribution relationship illustrated in FIG. 19 is not an exhaustive list. Illustratively, a recipient may be assigned to more than one class; a recipient may also be directly referenced by a class node; and a subclass may have more than one parent class. FIG. 20 illustrates such an alternative data distribution model 2000 and the associated data provided to each recipient.

Realization of data distribution models similar to those of FIGS. 19 and 20 has been previously described with reference to FIGS. 1–18. Thus, data can be distributed immediately, by a batch process, or the occurrence of a user-defined event. Data can be distributed in accordance with a distribution control file. Distribution transactions can be monitored for frequency to prompt a user to create a new distribution relationship automatically or sever an unused distribution relationship. Finally, data files can be monitored for changes from the last distribution to prevent repetitive distribution of unchanged data files during automated distributions or distributions triggered by a user-defined event.

Although the invention has been described in detail with reference to certain preferred embodiments, one of ordinary skill in the art will readily appreciated that variations and modifications exist within the scope and spirit of the invention as described and defined in the following claims.

What is claimed is:

1. A computer-implemented method of distributing e-mail messages to a plurality of recipients associated with a corresponding plurality of recipient accounts, comprising the steps of:
   associating a plurality of classes arranged in a class hierarchy with the plurality of recipient accounts;
   associating a plurality of data sets with die plurality of classes and the plurality of recipient accounts;
   creating a plurality of recipient data sets by associating each data set associated with a class to each recipient account associated with the class so that each recipient data set includes only data sets associated with each corresponding recipient account; and
   distributing the plurality of recipient data sets to the corresponding plurality of recipients by automatically generating for each corresponding recipient account a corresponding single e-mail message that includes the recipient data set that includes only the data sets associated with the corresponding recipient account.

2. The method of claim 1, wherein the step of associating a plurality of classes arranged in a class hierarchy with the plurality of recipient accounts comprises the step of arranging the plurality of classes in a parent-child relationship.

3. The method of claim 2, wherein the step of associating a plurality of data sets with the plurality of classes and the plurality of recipient accounts comprises the steps of:
   associating a data set with a parent class; and
   associating the data set associated with the parent class with a related child class.

4. The method of claim 3, wherein the step of creating a plurality of recipient data sets by associating each data set associated with a class to each recipient account associated with the class so that each recipient data set includes only data sets associated each corresponding recipient account comprises the step of associating each data set associated with a child class to each recipient account associated with the child class.

5. The method of claim 1, further comprising the steps of:
   defining an event; and
   distributing the plurality of recipient data sets to the corresponding plurality of recipients upon an occurrence of the event.

6. The method of claim 4, further comprising the steps of:
   defining an event; and
   distributing the plurality of recipient data sets to the corresponding plurality of recipients upon an occurrence of the event.

7. The method of claim 1, further comprising the steps of:
   defining a distribution frequency threshold;
   determining a distribution frequency for one of the data sets; and
   automatically associating the data set if the distribution frequency of the data set exceeds the distribution frequency threshold.

8. The method of claim 7, wherein the step of determining a distribution frequency for one of the data sets comprises the steps of determining the number of times the data set is distributed to a particular recipient over a period of time.

9. The method of claim 8, wherein the step of automatically associating the data set if the distribution frequency of the data set exceeds the distribution frequency threshold comprises the steps of:
   comparing the distribution frequency of the data set to the distribution frequency threshold; and
   associating the data set to a recipient account corresponding to the particular recipient.

10. The method of claim 1, wherein the step of distributing the plurality of recipient data sets to the corresponding plurality of recipients comprises the steps of:
compressing each of the recipient data sets;
sending the plurality of recipient data sets to the corresponding plurality of recipients over a computer network; and
disassociating the plurality of data sets with the plurality of classes and the plurality of recipient accounts.

11. A system for distributing e-mail messages to a plurality of recipients associated with a corresponding plurality of recipient accounts, comprising:
means for associating a plurality of classes arranged in a class hierarchy with the plurality of recipient accounts;
means for associating a plurality of data sets with the plurality of classes and the plurality of recipient accounts;
means for creating a plurality of recipient data sets by associating each data set associated with a class to each recipient account associated with the class so that each recipient data set includes only data sets associated with each corresponding recipient account; and
means for distributing the plurality of recipient data sets to the corresponding plurality of recipients by automatically generating for each corresponding recipient account a corresponding single e-mail message that includes the recipient data set that includes only the data sets associated with the corresponding recipient account.

12. The system of claim 11, wherein the means for associating a plurality of classes arranged in a class hierarchy with the plurality of recipient accounts comprises means for arranging the plurality of classes in a parent-child relationship.

13. The system of claim 12, wherein the means for associating a plurality of data sets with the plurality of classes and the plurality of recipient accounts comprises:
means for associating a data set with a parent class; and
means for associating the data set associated with the parent class with a related child class.

14. The system of claim 13, wherein the means for creating a plurality of recipient data sets by associating each data set with a class to each recipient account associated with the class so that each recipient data set includes only data sets associated each corresponding recipient account comprises means for associating each data set associated with a child class to each recipient account associated with the child class.

15. The system of claim 14, further comprising:
means for defining an event; and
means for distributing the plurality of recipient data sets to the corresponding plurality of recipients upon an occurrence of the event.

16. The system of claim 11, further comprising:
means for defining an event; and
means for distributing the plurality of recipient data sets to the corresponding plurality of recipients upon an occurrence of the event.

17. The system claim 11, further comprising:
means for defining a distribution frequency threshold;
means for determining a distribution frequency for one of the data sets; and
means for automatically associating the data set if the distribution frequency of the data set exceeds the distribution frequency threshold.

18. The system of claim 17, wherein the means for automatically associating the data set if the distribution frequency of the data set exceeds the distribution frequency threshold comprises:
means for comparing the distribution frequency of the data set to the distribution frequency threshold; and
means for associating the data set to a recipient account corresponding to the particular recipient.

19. The system of claim 11, wherein the means for distributing the plurality of recipient data sets to the corresponding plurality of recipients comprises:
means for compressing each of the recipient data sets;
means for sending the plurality of recipient data sets to the corresponding plurality of recipients over a computer network; and
means for disassociating the plurality of data sets with the plurality of classes and the plurality of recipient accounts.

20. A system for distributing e-mail messages to a plurality of recipients corresponding to a plurality of recipient accounts, the system comprising:
a computer storage medium storing a data structure and a program;
a computer system having access to the computer storage medium and configured to execute the application program;
wherein the data structure includes a plurality of classes arranged in a class hierarchy, and further includes the plurality of recipient accounts associated with the plurality of classes; and
wherein the program associates data sets to selected classes and selected recipient accounts, creates a plurality of recipient data sets by associating data sets associated with a selected class to the recipient accounts associated with the selected class so that each recipient data set includes only data sets associated with each corresponding recipient account, and distributes the plurality of recipient data sets to the corresponding plurality of recipients by automatically generating for each corresponding recipient account a corresponding single e-mail message that includes the recipient data set that includes only the data sets associated with the corresponding recipient account.

21. The system of claim 20, wherein the hierarchy includes parent classes and child classes, and wherein the program associates data sets associated with a parent class to child classes associated with the parent class, and further associates data sets associated with the child classes associated with the parents classes to recipient accounts associated with the child classes.

22. The system of claim 21, further comprising a distribution control file stored on the computer storage medium, the distribution control file storing the association of data sets to selected classes and selected recipient accounts.

23. The system of claim 22, wherein the program is configured to access the distribution control file and create the plurality of recipient data sets by associating data sets associated with a selected class to the recipient accounts associated with the selected class as specified in the distribution control file so that each recipient data set includes only data sets associated with each corresponding recipient account, and distribute the plurality of recipient data sets to the corresponding plurality of recipients.

24. The system of claim 23, wherein the program distributes the data sets upon an occurrence of an user-defined event.

25. The system of claim 24, wherein one of the data sets has a change status, the change status indicating whether a change in the data set has occurred since a previous distribution of the data set, and wherein the program distributes the data set upon the occurrence of the user-defined event only if the change status indicates a change in the data set has occurred.

26. The system of claim 21, wherein the data structure further includes for each class a class node and a recipient node, each class node referencing a child class, and each recipient node referencing a recipient account.

27. The system of claim 26, wherein the program is further configured to associate data sets with corresponding class nodes and recipient nodes.

28. The system of claim 27, wherein the program is further configured to associate each data set associated with each class node to each corresponding classes referenced by the class node, and associate each data set associated with each recipient node to the each corresponding recipient account referenced by the recipient node.

29. The system of claim 20, further comprising a transaction file stored on the computer storage medium, the transaction file storing a transaction history of the distribution of data sets.

30. The system of claim 29, wherein the program is further configured to access the transaction file and determine the distribution frequency of each data set.

31. The system of claim 30, further comprising a distribution control file stored on the computer storage medium, the distribution control file storing the association of data sets to selected classes and selected recipient accounts, and wherein the program is further configured to update the distribution control file to include an association of a data set to selected classes and selected recipient accounts if the distribution frequency of the data set to the selected classes and recipient accounts exceeds a threshold value.

32. The system of claim 31, wherein the program is configured to access the distribution control file and create the plurality of recipient data sets by associating data sets associated with a selected class to the recipient accounts associated with the selected class as specified in the distribution control file so that each recipient data set includes only data sets associated with each corresponding recipient account, and distribute the plurality of recipient data sets to the corresponding plurality of recipients.

33. The system of claim 32, wherein the program distributes the recipient data sets upon an occurrence of an user-defined event.

34. The system of claim 33, wherein one of the data sets has a change status, the change status indicating whether a change in the data set has occurred since a previous distribution of the data set, and wherein the program distributes the data set upon the occurrence of the user-defined event only if the change status indicates a change in the data set has occurred.

35. A computer-implemented method of e-mailing files, comprising the steps of:
associating a first file with a class of recipients;
associating a second file with one recipient in the class;
creating a data set for each recipient in the class, wherein only the data set corresponding to the one recipient includes the second file; and
distributing the data sets to the recipients by automatically generating a single e-mail message addressed to a recipient account associated with the one recipient, the single e-mail message including the data set corresponding to the one recipient;
wherein the step of associating the first file includes defining recipients of the first file to include all recipients in the class and all recipients in any subordinate classes related to the class in the hierarchy.

36. The method of claim 35 further including the step of creating a hierarchy of classes including the class.

37. The method of claim 36 wherein the classes in the hierarchy are arranged in a parent-child relationship.

38. The method of claim 36 further including the step of automatically associating a file with a recipient if the file has been distributed to the recipient at a frequency that exceeds a predetermined distribution frequency threshold.

39. The method of claim 36 wherein the step of distributing the data sets includes the step of compressing the data sets.

40. The method claim 36 wherein the step of distributing the data sets includes the step of sending a single e-mail to each recipient including a data set corresponding to the recipient.

41. The method of claim 36 further including the step of copying the first file to recipient accounts respectively corresponding to the recipients in the first class.

42. The method of claim 41 further including the step of copying the second file to the recipient account corresponding to the one recipient.

43. The method of claim 35 further including the step of defining an event, the step of distributing the data sets corresponding to an occurrence of the event.

44. The method of claim 43 wherein the data sets are distributed upon every occurrence of the event.

45. A program stored in a computer-readable medium, the program for distributing files by e-mail to recipients connected by a network, comprising:
code for defining a class of recipients;
code for associating a first file with the class of recipients;
code for associating a second file with one recipient in the class;
code for creating a data set for each recipient in the class, wherein only the data set corresponding to the one recipient includes the second file; and
code for distributing the data sets to the by automatically generating a single e-mail message addressed to a recipient account associated with the one recipient, the single e-mail message including the data set corresponding to the one recipient;
wherein the code for associating the first file defines recipients of the first file to include all recipients in the class and all recipients in any subordinate classes in the hierarchy related to the class.

46. The program of claim 45 further including code for creating a hierarchy of classes including the class of recipients.

47. The program of claim 46 wherein the classes in the hierarchy are arranged in a parent-child relationship.

48. The program of claim 45 wherein the code for distributing the data sets is executed upon the occurrence of a user-defined event.

49. The program of claim 48 wherein the data sets are distributed upon every occurrence of the event.

50. The program of claim 45 wherein the code for associating the first file and the second file automatically associates one of the first file and the second file with a recipient if the one file has been distributed to the recipient at a frequency that exceeds a predetermined distribution frequency threshold.

51. The program of claim 45 further including code for compressing the data sets for distribution.

52. The program of claim 45 wherein each data set is distributed as a single e-mail to a corresponding recipient.

* * * * *